(12) United States Patent
Urs

(10) Patent No.: US 10,450,480 B2
(45) Date of Patent: Oct. 22, 2019

(54) WATER-REDUCIBLE SINGLE-COMPONENT MOISTURE-CURING POLYURETHANE COATINGS

(71) Applicant: Hentzen Coatings, Inc., Milwaukee, WI (US)

(72) Inventor: Bhaskar R. Urs, Scottsdale, AZ (US)

(73) Assignee: Hentzen Coatings, Inc., Milwaukee, WI (US)

( * ) Notice: Subject to any disclaimer, the term of this patent is extended or adjusted under 35 U.S.C. 154(b) by 327 days.

(21) Appl. No.: 13/800,940

(22) Filed: Mar. 13, 2013

(65) Prior Publication Data
US 2015/0376448 A1    Dec. 31, 2015

(51) Int. Cl.
| C09D 175/04 | (2006.01) |
| C08G 18/70 | (2006.01) |
| C08G 18/75 | (2006.01) |
| C08G 18/24 | (2006.01) |
| C08G 18/30 | (2006.01) |
| C08G 18/42 | (2006.01) |
| C08G 18/46 | (2006.01) |

(52) U.S. Cl.
CPC ......... *C09D 175/04* (2013.01); *C08G 18/246* (2013.01); *C08G 18/307* (2013.01); *C08G 18/42* (2013.01); *C08G 18/4615* (2013.01); *C08G 18/70* (2013.01); *C08G 18/706* (2013.01); *C08G 18/755* (2013.01)

(58) Field of Classification Search
CPC ......... C09D 175/04; C08G 18/70; C08J 3/215
See application file for complete search history.

(56) References Cited

U.S. PATENT DOCUMENTS

| 3,917,556 A | 11/1975 | Baurecht et al. |
| 3,969,128 A | 7/1976 | Urs |
| 4,049,610 A | 9/1977 | Bunge et al. |
| 4,075,152 A | 2/1978 | Taller |
| 4,129,455 A | 12/1978 | Thompson et al. |
| 4,143,181 A | 3/1979 | Cahn et al. |
| 4,180,491 A | 12/1979 | Kim et al. |
| 4,304,706 A * | 12/1981 | Urs .................. C08G 18/10 524/88 |
| 4,523,003 A | 6/1985 | Bezwada |
| 4,738,989 A | 4/1988 | Smith |
| 5,115,007 A | 5/1992 | Chihara et al. |
| 5,124,210 A | 6/1992 | Fong |
| 5,128,423 A | 7/1992 | Parrinello et al. |
| 5,221,337 A | 6/1993 | Luers et al. |
| 5,506,328 A * | 4/1996 | Chandalia .......... C08G 18/1825 427/385.5 |
| 5,691,410 A | 11/1997 | Escarsega et al. |
| 5,985,986 A * | 11/1999 | Kubitza ............... C08G 18/283 427/372.2 |
| 5,998,532 A | 12/1999 | Urs |
| 6,492,482 B2 | 12/2002 | Lomoelder et al. |
| 6,582,326 B2 | 6/2003 | Wu et al. |
| 6,878,771 B2 | 4/2005 | Urs |
| 2001/0051229 A1 | 12/2001 | Witt |
| 2002/0106517 A1 | 8/2002 | Tian |
| 2002/0160863 A1 | 10/2002 | Wu et al. |
| 2004/0063844 A1 * | 4/2004 | Urs .................. C08G 18/10 524/492 |
| 2006/0106161 A1 | 5/2006 | Sawant et al. |
| 2008/0045641 A1 * | 2/2008 | Dorr ................ C08G 18/0823 524/457 |
| 2008/0199625 A1 * | 8/2008 | Niwa .................... B05D 7/542 427/407.1 |
| 2011/0054141 A1 * | 3/2011 | Best ................... C08G 18/088 528/67 |
| 2011/0293842 A1 | 12/2011 | Flosbach et al. |

FOREIGN PATENT DOCUMENTS

WO    2011154192 A1    12/2011

OTHER PUBLICATIONS

Pourreau, D.B., et al., "Formulating VOC-Compliant Coatings with Exempt Solvents," Paint & Coatings Magazine, Date: Nov. 1999.
Modec Inc., "Formulations for the Decontamination and Mitigation of CB Warfare Agents, Toxic Hazardous Materials, Viruses, Bacteria and Bacterial Spores," Date: Feb. 2003.
Clariant International Ltd., "Stabilizers for Coatings Applications," Date: Copyright 2011.
Escarsega, John A., et al., U.S. Army Research Laboratory, "Recent Developments in Water-Reducible Chemical Agent Resistant Coatings," Date: Before Jan. 2013.
U.S. Army Research Laboratory, MIL-DTL—53039D, "Detail Specification Coating, Aliphatic Polyurethane, Single Component, Chemical Agent Resistant," Date: Jan. 24, 2011.
U.S. Army Research Laboratory, MIL-DTL-64159B, "Detail Specification Camouflage Coating, Water Dispersible Aliphatic Polyurethane, Chemical Agent Resistant," Date: Jan. 24, 2011.
Milspray Military Technologies, "Milspray MIL-DTL-5039 C/D Type IV Single Component CARC," Material Safety Data Sheet, Date: Jul. 27, 2011.
Sherwin Williams, "MIL-DTL-64159 Type II—Waterborne Polyurethane CARC," Brochure, Date: Copyright 2006.
Sherwin Williams, "MIL-DTL-64159 Type I Waterborne Polyurethane Chemical Agent Resistant Coating," Data Sheet, Date: Feb. 2008.
Sherwin Williams, "MIL-DTL-64159B, Type II Waterborne Polyurethane Chemical Agent Resistant Coating," Data Sheet, Date: Jun. 2011.

(Continued)

*Primary Examiner* — Michael L Leonard
(74) *Attorney, Agent, or Firm* — Jansson Munger McKinley & Kirby Ltd.

(57) ABSTRACT

Water-reducible single-component moisture-curing polyurethane coatings are disclosed. Water-reducible single-component moisture-curing polyurethane coatings have excellent surface properties with controlled surface imperfections and cure rapidly. Water-reducible single-component moisture-curing polyurethane coatings can be formulated with constituents minimizing or eliminating VOC content. The water-reducible single-component moisture-curing polyurethane coatings are suitable for use as protective and/or decorative coatings.

34 Claims, No Drawings

(56) References Cited

OTHER PUBLICATIONS

Star Hentzen Coatings PVT. Ltd., "Defense and Aerospace Coatings," Product Catalog, Date: Feb. 2010.
Star Hentzen Coatings PVT. Ltd., "Defense and Aerospace Coatings," <www.starhentzen.com/products/defense-topcoats.htm>, Date: Before Jun. 2012.
PCT/US13/30924, International Search Report and Written Opinion, dated May 21, 2013.
M.J. Dvorchek, et al., "Aldimine-Isocyanate Chemistry: application in High Solids Coatings," Waterborne, Higher-Solids, and Powder Coatings Symposium, Date: Feb. 22-24, 1995, pp. 78-87.
S.M. Lee, et al., "Aklimine-Isocyanate Chemistry: A Foundation for High Solids Coatings," Waterborne, Higher-Solids, and Powder Coatings Symposium, Date: Feb. 22-24, 1995, pp. 69-77.
Wicks, et al., "Amine Chemistries for Isocyanate-Based Coatings," Progress in Organic Coatings, vol. 30, Date: 1997, pp. 265-270.

\* cited by examiner

WATER-REDUCIBLE SINGLE-COMPONENT MOISTURE-CURING POLYURETHANE COATINGS

FIELD

The field is coating compositions and, more particularly, polyurethane coating compositions.

BACKGROUND

Polyurethane coatings have been developed for use as topcoats (i.e., paints) for coating a broad range of objects including vehicles (e.g., wheeled and tracked vehicles, aircraft, ships, etc.), machinery, equipment, buildings, and other structures and articles. Polyurethane coatings have also found use in military applications, for example, as chemical agent resistant coatings (referred to by the acronym "CARC") for application to military equipment and as military vehicle camouflage coatings.

Polyurethane coatings are presently provided as either single-component or as plural-component coatings. Single-component moisture-curing polyurethane coatings refer generally to a class of coating compositions which are pre-manufactured and which do not require further mixing together of separate coating components before use. Plural-component water-reducible polyurethane coatings refer generally to a class of coating compositions which are provided as separate components in two or more containers. One component includes a polyol and the other component includes an isocyanate. The user must admix the components before use. The polyol and isocyanate react to yield the polyurethane coating.

Single-component moisture-curing polyurethane coatings are generally preferred over plural-component water-reducible coatings because they can be used directly from the container in which the coatings are supplied and, therefore, are easier to use. In contrast, plural-component water-reducible polyurethane coatings are relatively more difficult to use as compared to single-component coatings because of the need to admix the coating components at the point of application and before use.

Single and plural-component polyurethane coatings are most frequently applied to vehicles, machines, and other objects by means of spray application. Single-component moisture-curing polyurethane coatings are typically applied with an air atomizing spray gun directly out of a pressure pot. Plural-component water-reducible polyurethane coatings may be applied with a plural-component proportioning system. Alternatively, the components of the plural-component water-reducible polyurethane coatings may be admixed before use, permitting application with a spray gun. Single and plural-component polyurethane coatings can also be applied with a roller or brush, for example to touch up a coated object.

Single-component moisture-curing polyurethane coatings are typically ready to be sprayed as supplied. Plural-component polyurethane coatings are typically reduced with water during spray application to achieve the desired coating viscosity.

When applying polyurethane coatings to a vehicle, machine, or other object, it is important that the finished-form coating have a consistent and uniform surface free of surface imperfections. "Blisters" are a common type of surface imperfection which should be avoided in the coating applied to the object. A blister or blistering means or refers to formation of dome-shaped projections in a film resulting from local loss of adhesion and lifting of the film from the underlying surface. Blisters can be formed in a polyurethane coating by release of carbon dioxide gas during curing.

Another surface imperfection which should be avoided is referred to as "crazing." Crazing means or refers to fine lines or very small surface cracks on the film.

Yet another type of surface imperfection is known as "sagging." Sagging means or refers to accumulations of coating caused by running of the flowable coating shortly after application to the object and before the coating has cured sufficiently to no longer run or flow. The sagging appears as a built up irregularity in the finished-form coating which detracts from the uniformity and consistency of the coating. Sagging is a particular problem with respect to coatings applied to vertical and sloped surfaces.

In addition to aesthetic considerations, a consistent and uniform surface is important to ensure that the coating performs as required. Defects such as blisters, crazing, or sagging can form voids, gaps, and other irregularities in the coating. Voids, gaps, and other irregularities can, in turn, lead to deterioration and failure of the coating. Any deterioration or failure of the coating can result in corrosion, or other damage to the object on which the coating is applied.

Provision of a continuous, uninterrupted coated surface is of particular importance in conjunction with CARC coatings applied to military vehicles and other military objects. This is because CARC coatings must provide a continuous, uninterrupted barrier to penetration of chemical agents to thereby protect the coated object from damage which could be caused by the chemical agent. Further, the CARC coatings must be resistant to harsh decontamination and cleaning agents such as Decontaminant Solution 2 (DS-2) (70% diethylene triamine/28% ethylene glycol monomethyl ether/2% sodium hydroxide) and supertropical bleach (93% calcium hypochlorite/7% sodium hydroxide) which are used to remove chemical agents and clean military vehicles.

Blisters, crazing, sagging, or other surface imperfections are deemed to be defects in the coating. The presence of any of these defects can result in rejection of the coated object by the customer. If the object is rejected, then the defective coating must be removed and the coating re-applied. The process of correcting defects is time consuming, results in increased costs, and is generally to be avoided.

Blistering and crazing are particular problems when applying plural-component water-reducible polyurethane coatings because of carbon dioxide gas formation during curing of the coating. Carbon dioxide gas formation occurs when the plural-component water-reducible polyurethane coating reacts with water in the polyol-containing component or with atmospheric moisture during curing. Carbon dioxide gas may also be formed when the plural-component polyurethane coating reacts with the water which may be used to dilute and reduce the coating viscosity during application to an object. When released from the coating, the carbon dioxide gas can cause formation of blisters and/or crazing in the coating.

Such blistering and crazing is a particular problem when the film thickness exceeds 5 mils (0.005 inch) dry film thickness (DFT) in humid conditions. The blistering and/or crazing occur in thick coating builds because the carbon dioxide cannot escape from the thick film build. Application of the plural-component moisture-curing polyurethane coatings in humid conditions can result in blistering and/or crazing because the water does not readily evaporate from the coating during curing, promoting carbon dioxide formation and the resultant formation of surface imperfections in the cured coating. Because the objects to be painted are of complex configurations, excessive film builds above 5 mils are inevitable. Consequently, the risk of blistering and/or crazing is significant when applying plural-component water-reducible polyurethane coatings to an object.

Plural-component water-reducible polyurethane coatings are relatively slow to cure because these coatings include low levels of catalyst for purposes of maintaining an adequate pot life. Because the plural-component water-reducible polyurethane coatings remain tacky for an extended time after application to the object, such plural-component water-reducible polyurethane coatings must typically be cured in a dust-free booth to prevent dust and other contaminants from contacting and adhering to the coating during curing. The relatively long amount of time to cure the coated object reduces throughput, potentially increasing cost.

Curing of objects in an oven or with an infrared or other energy source is frequently utilized to accelerate curing of the plural-component water-reducible polyurethane coatings. However, use of an oven or other energy source to accelerate curing is energy intensive and imposes further costs on the coating applicator.

Single-component moisture-curing polyurethane coatings avoid or minimize certain of the aforementioned problems associated with plural-component water-reducible polyurethane coatings. As stated, an advantage of single-component moisture-curing polyurethane coatings is that they are used as supplied. Water is not used as a viscosity modifier which limits carbon dioxide gas formation during curing. Water cannot be used to modify the viscosity of single-component moisture-curing polyurethane coatings because use of water causes the single-component moisture-curing polyurethane coatings to immediately gel, rendering the coatings unsuitable for use.

Single-component moisture-curing polyurethane coatings are very good coatings, in part, because they are convenient to use as supplied and do not require viscosity modification as stated previously. However, use of single-component moisture-curing polyurethane coatings without reduction requires a relatively greater amount of the coating from the supplier. This increases the cost to ship and supply the coating to the applicator.

A further shortcoming of existing single and plural-component polyurethane coatings is that these coatings are formulated with solvents including volatile organic compounds (VOCs). There is regulatory pressure to reduce the amount of VOCs in these coatings. A typical single-component moisture-curing polyurethane coating can include about 1 pound of VOC-containing solvents per gallon of coating while a typical plural-component water-reducible polyurethane coating can include about 1.5 pounds of VOC-containing solvents per gallon of coating. It would be desirable to avoid the necessity that a VOC-containing organic solvent be utilized as a reducing agent and it would be further desirable to reduce or eliminate VOC-containing constituents in the polyurethane coatings and to replace those solvents with constituents that are deemed to be more environmentally friendly.

In addition to the foregoing considerations, moisture-curing polyurethane coatings for military applications must comply with stringent technical and performance specifications. Presently, single-component moisture-curing polyurethane coatings must comply with U.S. Department of Defense specification MIL-DTL-53039D and plural-component water-reducible polyurethane coatings must comply with U.S. Department of Defense specification MIL-DTL-64159B. Both specifications presently impose stringent requirements for color and reflectance, hiding power, drying time, specular gloss, infrared reflectance, and other properties and capabilities.

It would be an improvement in the art to provide a water-reducible, single-component, moisture-curing polyurethane coating which would be easy to handle and apply to an object, which would provide a coating free of surface imperfections, which would cure rapidly in ambient conditions, which could be formulated in a more environmentally-friendly manner, and which could be formulated for compliance with current military specifications.

SUMMARY

Water-reducible single-component moisture-curing polyurethane coating and methods of making the compositions are disclosed. In embodiments, water-reducible single-component moisture-curing polyurethane coating compositions comprise about 70 to about 25 percent by weight of a substantially-dehydrated pigmented dispersion and about 30 to about 75 percent by weight let down including water-reducible aliphatic polyisocyanate. The pigmented dispersion and let down form a water-reducible admixture. Potential applications for water-reducible single-component moisture-curing polyurethane compositions include use as protective and/or decorative coatings. Camouflage and matte-finish paints are examples.

Water-reducible single-component moisture-curing polyurethane coating compositions can be formulated to provide excellent finished-form coatings free of blistering and other surface imperfections, such as sagging and crazing. The coatings may be formulated as ready-to-use products which may be conveniently used directly from the container. Coatings of the types described herein may be conveniently applied to an object with a proportioning system and may be reduced with water, rather than organic solvent, providing an opportunity for a more environmentally-friendly product.

In embodiments, water-reducible single-component moisture-curing polyurethane coating compositions can be formulated to reduce or eliminate VOC-content, providing a further opportunity for a more environmentally-friendly product. Preferably, water-reducible single-component moisture-curing polyurethane coating compositions may comprise, based on the total composition, about 15 to about 60 percent by weight VOC-exempt solvent. The VOC-exempt solvent may be present in the pigmented dispersion and let down. In other embodiments, the pigmented dispersion may be formulated to include all of the VOC-exempt organic solvent. In certain embodiments, the pigmented dispersion may include, based on the total composition, about 30 to about 50 percent by weight VOC-exempt solvent. VOC-exempt organic solvents may include dimethyl carbonate, propylene carbonate, tertiary butyl acetate, methyl acetate, and acetone. Mixtures of the foregoing VOC-exempt solvents may be used, for example to control curing of the coating compositions.

In embodiments, a pigmented dispersion may include pigmented slurry and dehydrating agent. The dehydrating agent is provided to remove essentially all water from pigments or other sources in the pigmented slurry. Preferably, the pigmented dispersion comprises, based on the total coating composition, about 20 to about 65 percent by weight pigmented slurry and about 0.2 to about 5 percent by weight of dehydrating agent. Preferred dehydrating agents include monomeric polyisocyanates and monomeric monoisocyanates. Other dehydrating agents and processes may be utilized including orthoesters, and molecular sieves, and distillation with organic solvent. The pigmented slurry may further include, based on the total coating composition, about 5 to about 30 percent by weight of the VOC-exempt solvent or solvents.

In embodiments, the pigmented dispersion further includes, based on the total coating composition, about 0.2 to about 5 percent by weight polyol. In embodiments including monomeric polyisocyanate and/or monomeric monoisocyanate dehydrating agents, the polyol undergoes an extension reaction with any dehydrating agent in excess of the amount stoichiometrically sufficient to essentially dehydrate the pigmented slurry. Polyols are also useful to impart improved viscosity particularly for embodiments using dehydrating agents other than monomeric polyisocyanate and/or monomeric monoisocyanates. The pigmented dispersion may further include a catalyst to accelerate dehydration and/or extension reactions. Exemplary catalysts include organometallic catalysts and tertiary amine catalysts.

In embodiments, the let down comprises all of the constituents not included in the pigmented dispersion. Preferably, the let down includes, based on the total coating composition, about 5 to about 30 percent by weight water-reducible aliphatic polyisocyanate with about 10 to about 20 percent by weight water-reducible aliphatic polyisocyanate (based on the total composition) also being a useful range. About 12 to about 16 percent by weight water-reducible aliphatic polyisocyanate, based on the total composition, is a preferred range in certain embodiments. Representative water-reducible aliphatic polyisocyanate include dimers, trimers, and oligomers of hexamethylene diisocyanate. Mixtures of water-reducible aliphatic polyisocyanates may be utilized in the let down. The let down may also include, based on the total coating composition, about 5 to about 30 percent by weight of the exemplary VOC-exempt organic solvents described above, and solvent mixtures may be utilized.

In embodiments, a matting agent may be provided to reduce gloss and sheen of the finished-form film applied to an object. A preferred range of matting agent for use in the coating composition is about 5 to about 25 percent by weight based on the total coating composition. Polyethylene wax, polypropylene wax, and mixtures of these waxes represent potential matting agents.

DETAILED DESCRIPTION

Exemplary water-reducible single-component moisture-curing polyurethane coatings and methods of making the compositions will now be described in detail with respect to the detailed description and examples which follow. The preferred embodiments described herein are not intended to be exhaustive or to limit the invention to the precise form disclosed. The section headings provided herein are for convenience only and are not intended to limit the scope of the invention in any way.

DEFINITIONS

"A" or "an" means one or more.

"About" means approximately or nearly, and in the context of a numerical value or range set forth herein, means±10% of the numerical value or range recited or claimed.

"Admix" means to mix or blend.

"Aliphatic" means or refers to saturated or unsaturated non-aromatic hydrocarbon compounds in which the constituent carbon atoms can be straight-chain, branched chain, or cyclic.

"Cure" or "curing" means or refers to the process whereby a liquid coating becomes a hard film.

"Dry" or "drying" means or refers to the process whereby a liquid coating is converted into a solid, nontacky surface.

"Dry film thickness", or DFT, means or refers to the thickness of a coating film after the evaporation of solvent and other drying reactions. In this application, dry film thickness is reported in mils (thousandths of an inch).

A "finished-form film" means or refers to the film produced by a moisture-curing polyurethane coating composition following curing.

"Let down" means or refers to the balance of constituents of the composition apart from the substantially-dehydrated pigment dispersion.

A "matte appearance" or "finish" means or refers to an appearance which is generally dull, having low levels of gloss and/or sheen.

A "moisture-curing polyurethane coating composition" means or refers to a polyurethane coating composition which reacts with atmospheric moisture to cure and form a film.

A "proportioning system" means or refers to an application device with the capability to admix and spray components, such as a coating component and a solvent component, at very precise ratios.

A "polyisocyanate" means or refers to an isocyanate containing more than one isocyanate group.

A "polyol" means or refers to a compound containing more than one hydroxyl group.

A "polyolefin" means or refers to a polymer produced from a simple olefin as a monomer. For example, polypropylene is the polyolefin produced by polymerizing the olefin ethylene.

"Substantially-dehydrated pigmented dispersion" means or refers, minimally, to a dispersion comprising an admixture of a pigmented slurry including organic solvent and a dehydrating agent. For brevity, the substantially-dehydrated pigmented dispersion is frequently referred to herein as simply pigmented dispersion. Sufficient water is removed to avoid gelling in the container before use. Other constituents, such as one or more polyol, dispersing agent, and/or solvent may be included to meet the formulator's needs.

"VOC-exempt solvent" means or refers to a solvent with negligible photochemical activity as defined by the United States Environmental Protection Agency (EPA) and listed in EPA regulation 40 C.F.R. 51.100(s). Some solvents may not be recognized as "VOC-exempt" in certain regions of the United States.

"Water-reducible aliphatic polyisocyanate" means or refers to an aliphatic isocyanate polymer which has been chemically modified to impart water miscibility.

"Water-reducible" means or refers to having the capability of viscosity modification through addition of water.

Overview

In general, embodiments of water-reducible single-component moisture-curing polyurethane coatings compositions comprise about 70 to about 25 percent by weight of a substantially-dehydrated pigmented dispersion and about 30 to about 75 percent by weight let down including water-reducible aliphatic polyisocyanate. The pigmented dispersion and let down form a water-reducible admixture which is capable of being reduced with water during spray application with a proportioning system which represents a significant improvement over existing single-component moisture-curing polyurethane coatings compositions because such compositions form a gel when combined with water. Unless stated otherwise, these and other weight percentages provided herein are based on the total coating composition including all constituents of the coating composition (hereinafter the "total composition").

The invention represents recognition that embodiments of single-component moisture-curing polyurethane coatings can be formulated for reduction and viscosity modification with water before or during application to an object. The invention represents a further recognition that embodiments of water-reducible single-component moisture-curing polyurethane coatings may be formulated with VOC-exempt solvents as a replacement for, or in combination with, VOC-containing solvents. Elimination or reduction of VOCs in, or used with, the water-reducible single-component moisture-curing polyurethane coatings provides an opportunity for much more environmentally-friendly products.

Water-reducible single-component moisture-curing polyurethane coatings as exemplified herein may be supplied to the customer in the form of prepackaged and ready-to-use single-component products. Formulation of the coatings as a single-component product represents a significant advantage over plural-component moisture-curing polyurethane coating compositions which require mixing of separate coating components before use.

Water-reducible single-component moisture-curing polyurethane coatings reduced with water are ideal for spray application with a plural-component proportioning system in which water is provided as a reducing agent and viscosity modifier. Use of water as a reducing agent, rather than organic solvent, beneficially minimizes impact on the environment. Such coating compositions can be easily spray-applied to wheeled and tracked vehicles, aircraft, ships, machinery, equipment, buildings, and other structures and objects. And, single-component moisture-curing polyurethane coatings as described herein can also be applied other than with a proportioning system, such as with a paint brush or roller. By way of example only, it may be desirable to apply the water-reducible single-component moisture-curing polyurethane coatings with a paint brush to touch up an area of an object which was not fully coated by means of the plural-component proportioning system.

Water-reducible single-component moisture-curing polyurethane coatings, examples of which are described herein, provide a finished-form film which is consistent, uniform, and free of surface imperfections such as blistering, crazing, and sagging even at film thicknesses exceeding 9 mils DFT. Sagging can be avoided even when the wet coating applied to an object exceeds 11 mils thickness. Water-reducible single-component moisture-curing polyurethane coatings can be formulated to dry and cure very favorably relative to existing single- and plural-component moisture-curing polyurethane coatings under ambient conditions and without any requirement for use of an oven or other energy source. The rapid curing can contribute to avoidance of sagging.

Water-reducible single-component moisture-curing polyurethane coating compositions can be formulated which yield a finished-form film having a gloss (taken at an angle of 60°) of less than about 3 and a sheen (taken at an angle of 85°) of less than about 8. In embodiments, the performance of the finished-form film provided by such water-reducible single-component moisture-curing polyurethane coating compositions is compliant with United States military specifications MIL-DTL-53039D and MIL-DTL-64159B and such coating compositions are suitable for use as camouflage coatings and for other military applications. Coating compositions with gloss and sheen values above 3 and 8 respectively, while not compliant with the aforementioned military specifications, are within the scope of the invention.

In sum, embodiments of water-reducible single-component moisture-curing polyurethane coating compositions of the type described herein represent an improvement over the art at least because they can be formulated as an easy to use single-component coating composition, can be formulated to have low or no VOC content, have improved curing with reduced drying and curing times, and provide an improved finished-form film free of surface imperfections while having the capability of being fully compliant with MIL-DTL-53039D and MIL-DTL-64159B performance requirements.

Pigmented Dispersion

Embodiments of a preferred substantially-dehydrated pigmented dispersion will now be described. In embodiments, a pigmented dispersion substantially dehydrated of water is admixed with a let down to yield the water-reducible single-component moisture-curing polyurethane coatings compositions. In embodiments, the pigmented dispersion comprises a dispersion of pigmented slurry, an organic solvent, and a dehydrating agent. The organic solvent is preferably a VOC-exempt solvent. In highly preferred embodiments, one or more polyol and a dispersing agent are further included. Other constituents, such as additional solvent, catalyst, flow aids, and light stabilizers may be included to meet the needs of the formulator and end user.

In preferred embodiments of the pigmented dispersion, the pigmented slurry of the pigmented dispersion comprises about 20 to about 65 percent by weight of the total coating composition (about 40 to about 90 percent by weight of the pigmented dispersion), the organic solvent of the pigmented dispersion comprises about 15 to about 60 percent by weight of the total coating composition (about 30 to about 80 percent by weight of the pigmented dispersion). The organic solvent may be a portion of the pigmented slurry and a separate addition admixed with the pigmented slurry. The dehydrating agent of the pigmented dispersion is provided to remove any water in the pigmented slurry (typically associated with pigments) and comprises about 0.2 to about 5 percent by weight of the total composition (about 0.40 to about 10 percent by weight of the pigmented dispersion). The dehydrating agent must be provided in an amount stoichiometrically sufficient to remove essentially all water from the pigmented slurry but may also be provided in excess of this amount for reaction with a polyol as described herein.

The polyol is optional in certain embodiments. In embodiments, the polyol undergoes an extension reaction with monomeric monoisocyanate dehydrating agents. In other embodiments the polyol can be used to disperse and stabilize the pigmented dispersion. The polyol may comprise about 0.2 to about 5 percent by weight of the total coating composition (about 0.4 to about 10 percent by weight of the pigmented dispersion). The pigmented dispersion can also include dispersing agents (i.e., flow aids) comprising about 0.1 to about 3 percent by weight of the total coating composition (about 0.2 to about 6 percent by weight of the pigmented dispersion). The catalyst of the pigmented dispersion may comprise about 0.02 to about 1.2 percent by weight of the total composition (about 0.04 to about 2.4 percent by weight of the pigmented dispersion).

The organic solvent is most preferably a VOC-exempt solvent in embodiments in which VOC reduction or elimination is desired. One or more VOC-exempt solvent may be utilized separately or in combination with one or more VOC-containing organic solvent based on the needs of the formulator or end user. While not preferred for reasons of VOC content, a VOC-containing organic solvent could be utilized within the above-mentioned range.

Pigmented Slurry

Referring now to the pigmented slurry constituent, an exemplary pigmented slurry comprises an admixture of at least one water-containing pigment, an organic solvent, and optional additives such as dispersing agents and thixotropes. The solvent is preferably a VOC-exempt solvent or mixtures of VOC-exempt solvents. However, one or more VOC-containing organic solvent could be used separately or in combination with a VOC-exempt solvent. VOC-containing solvents are not preferred if a reduction in VOCs is desired. Selection of the organic solvent or solvent mixtures enables the formulator to modify the curing characteristics (e.g., time to fully cure) of the water-reducible single-component moisture-curing polyurethane coatings to meet the needs of the end user.

In preferred embodiments, the pigment constituent of the pigmented slurry comprises about 1.8 to about 35 percent by weight of the total coating composition (about 10 to about 68 percent by weight of the pigmented slurry) and the organic solvent of the pigmented slurry comprises about 5 to about 30 percent by weight of the total coating composition (about 10 to about 80 percent by weight of the pigmented slurry). The balance of the pigmented slurry preferably comprises optional additives such as dispersing agents and thixotropes.

Pigments selected for use in the pigmented slurry may consist of one or more colored pigments well known to those of ordinary skill in the art. Such pigments are generally metal oxides. Preferred pigments include, but are not limited to, titanium dioxide, iron oxides, organic complexes, and mixed metal oxides. One pigment may be used, or a combination of two or more pigments may be utilized. Different colors can be obtained by choosing proper pigments and combining them in appropriate fashion with the necessary adjustments, common in the paint industry, being made. The pigments typically include water which is removed by a dehydrating agent as described herein.

The solvent or solvents for use in the pigmented slurry are selected to aid in formulation and material flow. In addition and as described herein, the exemplary solvent or solvents are believed to contribute to a surface appearance free of imperfections such as blisters and crazing.

Use of one or more VOC-exempt solvent provides an opportunity for the formulator to reduce or eliminate VOCs in the water-reducible single-component moisture-curing polyurethane coating composition because VOC-exempt solvents have negligible photochemical activity and, therefore, minimal or no VOC emissions. Solvents presently classified as VOC-exempt solvents which may be utilized for formulation of the pigmented slurry include dimethyl carbonate, propylene carbonate, methyl acetate, acetone, tertiary butyl acetate, and mixtures thereof. Mixtures may be particularly useful to modify characteristics of the coatings as previously described. It is anticipated that solvents other than the foregoing solvents may be deemed VOC-exempt in the future by the U.S. Environmental Protection Agency. While not preferred for reasons of VOC content, an organic solvent such as methyl ethyl ketone (MEK), methyl amyl ketone (MAK), and ethyl hexyl acetate could be utilized in place of, or in combination with, a VOC-exempt solvent.

While not wishing to be bound by any particular theory, it is believed that VOC-exempt solvents of the type described herein exhibit a type of azeotropic effect when combined with water used to reduce the viscosity of the water-reducible single-component moisture-curing polyurethane coating compositions, particularly during spray application with a proportioning system. The azeotropic effect is believed to decrease the boiling point of the water and increase the water vapor pressure which in turn is believed to cause water in the water-reducible single-component moisture-curing polyurethane coating compositions to rapidly evaporate even if the coating has achieved a thick film build on the object. The evaporation occurs in ambient conditions and even under conditions of high humidity. Since a majority of the water evaporates, it is not present to react with the water-reducible aliphatic polyisocyanate to form carbon dioxide gas. The resultant decrease in carbon dioxide gas production reduces formation of surface imperfections such as blisters and crazing. The azeotropic effect is also expected to occur with VOC-containing organic solvents.

Rapid water evaporation is also believed to accelerate curing and drying of the water-reducible single-component moisture-curing polyurethane coating compositions which limits sagging and decreases the amount of time required for the coating to cure. And, the rapid curing occurs without any requirement for an external energy source, such as an infrared lamp or other energy generator.

Dimethyl carbonate is highly preferred for use as a solvent in formulation of the pigmented slurry. Dimethyl carbonate is an organic compound which has the general structural formula $OC(OCH_3)_2$ and is classified as a carbonate ester. Dimethyl carbonate is a colorless, flammable liquid. Dimethyl carbonate is believed to promote particularly rapid water evaporation during curing of the coating thereby avoiding formation of surface imperfections such as blisters, crazing and sagging. Dimethyl carbonate is exempt from classification as a VOC and is environmentally friendly.

Optionally, thixotropes, and other constituents may be added to the pigmented slurry to provide performance benefits for the formulator.

Dehydration of Pigmented Slurry to Yield Pigmented Paste

In embodiments, a pigmented paste may next be produced by dehydrating the pigmented slurry and by optionally adding a polyol and other constituents. The pigmented paste is processed to yield the pigmented dispersion. Preferably, the pigmented slurry is first "dehydrated" such that any water is eliminated, or nearly eliminated, from the pigmented slurry. Dehydration is necessary because the presence of water in the coating before use would cause the coating to gel in the container, rendering the coating unsuitable for use. Colored pigments and certain types of flattening agents (e.g., mica, clay) typically contain adsorbed water which must be removed to produce a stable moisture-curing polyurethane coating composition.

A dehydrating agent is admixed with the pigmented slurry for the water dehydration. In certain embodiments, the dehydrating agent comprises one or more monomeric polyisocyanate or monomeric monoisocyanate, or mixtures of monomeric poly- and monoisocyanates. Preferably, the monomeric polyisocyanate and/or monoisocyanate of the pigmented dispersion comprises about 0.2 to about 5 percent by weight of the total composition (about 0.4 to about 10 percent by weight of the pigmented dispersion). Sufficient monomeric polyisocyanate or monomeric monoisocyanate, should be provided to maintain a viscosity such that the coating composition remains flowable.

Monomeric polyisocyanate and/or monomeric monoisocyanate in excess of the amount required to dehydrate the pigmented slurry may be admixed with the pigmented slurry in the presence of a catalyst of the type described herein. The monomeric polyisocyanate and/or monomeric monoisocyanate dehydrates and removes essentially all water from the pigmented slurry. A calculated excess of the monomeric polyisocyanate and/or monomeric monoisocyanate is provided to ensure that all, or essentially all, of the water is eliminated. Polyurea is formed as a byproduct of the dehydration reaction with the monomeric polyisocyanate while polyamide is formed as a byproduct of the dehydration reaction with a monomeric monoisocyanate of a sulphonyl isocyanate-type as described herein. As will be described, the excess monomeric polyisocyanate and/or monomeric monoisocyanate reacts with the polyol yielding a urethane polyol reaction product having an excess of unreacted hydroxyl groups.

In embodiments, the monomeric polyisocyanate selected for use in the dehydration reaction may be a diisocyanate. Representative monomeric diisocyanates include isophorone diisocyanate, 3-isocyanomethyl-3,5,5-trimethylcyclo-hexylisocyanate (IPDI), trimethyl hexamethylene diisocyanate, triisocyanate of 2,4,4-trimethyl-1,6-hexane diisocyanate (TMDI), hexamethylene diisocyanate, 1,6-hexamethylene-diisocyanate (HDI), toluene diisocyanate, 2,4-toluene diisocyanate and 2,6-toluene diisocyanate (TDI) and diphenylmethane diisocyanate, 2,4-diphenylmethane diisocyanate, and 4,4'-diphenylmethane diisocyanate (MDI). Mixtures of one or more aliphatic diisocyanates may be utilized. TMDI is excellent for flexible coatings and for exterior use. TDI is low priced and is useful for interior applications. MDI forms a tough chemical-resistant coating but may be limited with respect to durability in exterior applications.

In embodiments, the monomeric monoisocyanate selected for use in the dehydration reaction may be a monomeric monoisocyanate. A sulphonyl isocyanate such as paratoluenesulphonyl isocyanate (pTSI) is highly effective because pTSI reacts rapidly with water without catalyst. Other monomeric monoisocyanates could include phenyl isocyanate or butyl isocyanate. Mixtures of monomeric monoisocyanates and mixtures of monomeric polyisocyanates and monomeric monoisocyanates may be utilized.

The pigmented dispersion preferably includes one or more catalyst to accelerate dehydration of the pigmented slurry. In embodiments, the catalyst of the pigmented dispersion may comprise about 0.02 to about 1.2 percent by weight of the total composition (about 0.04 to about 2.4 percent by weight of the pigmented dispersion) as previously stated. The catalyst may be admixed directly with the constituents of the pigmented slurry during formulation of the pigmented slurry but is preferably added with the dehydrating agent to the finished-form pigmented slurry.

By way of example, catalysts which may be utilized can include organometallic catalysts and tertiary amine catalysts. Dibutyltin dilaurate is a preferred organometallic catalyst. Organometallic catalysts are highly preferred catalysts but can increase gloss and sheen in the finished-form film which may not be desirable in certain applications. Triethylene diamine and pentamethyl diethylene triamine are also suitable catalysts. A single tertiary amine may be used, or a combination of two or more may be provided as catalysts.

Dehydrating agents other than a monomeric polyisocyanate and/or monomeric monoisocyanate may be utilized in formulation of the pigmented paste. For example, in an embodiment, the dehydrating agent comprises one or more orthoester. An orthoester refers to a functional group containing three alkoxy groups attached to one carbon atom (i.e., the general formula $RC(OR')_3$), and to any organic compound that contains this functional group. Exemplary orthoesters include trimethyl orthoformate ($CH(OCH_3)_3$), triethyl orthoacetate ($CH_3C(OC_2H_5)_3$), and 2,2-dimethoxypropane ($(CH_3)_2C(OCH3)_2$).

In embodiments utilizing an orthoester dehydrating agent, orthoester in excess of the amount required to remove the water may be admixed with the pigmented slurry. The admixture is preferably made in the presence of an acid catalyst such as butyl acid phosphate and a catalyst such as the organometallic and tertiary amine catalysts described previously. Dibutyltin dilaurate is a preferred catalyst. The orthoester dehydrates and removes essentially all water from the pigmented slurry. A calculated excess of the orthoester is provided to ensure that all, or essentially all, of the water is eliminated. Ethanol is formed as a byproduct of the dehydration reaction with the orthoester. In embodiments implementing an orthoester dehydrating agent, the orthoester of the pigmented dispersion is provided in an amount of about 0.2 to about 4.2 percent by weight of the total composition (about 0.5 to about 7 percent by weight of the pigmented dispersion).

In another embodiment, the dehydrating agent comprises one or more organic solvent which is heated in a distillation process which removes water from the pigmented slurry. Toluene is a representative solvent for the distillation water-removal process. Other organic solvents may include xylene and mineral spirits. Mixtures of organic solvents may be used. The organic solvent is admixed with the pigmented slurry and the admixture is heated to the boiling point of the solvent for an appropriate time period until the water is driven off. The amount of solvent and the temperature and time of the heating will vary depending on the solvent implemented as would be known by a person of skill in the art.

Other dehydrating mechanisms, such as molecular sieves, may be utilized to dehydrate the pigmented slurry. A molecular sieve is a material containing tiny pores of a known size that is used as an adsorbent for gases and liquids. Molecules small enough to pass through the pores, such as water, are adsorbed by the molecular sieves while larger molecules are not. The molecular sieves act as a trap for the penetrating water molecules, which are retained within the pores. Because of this, molecular sieves often function as a desiccant. Representative molecular sieves include modified zeolites. Other molecular sieves include aluminosilicate minerals, clays, porous glasses, microporous charcoals, active carbons, or synthetic compounds that have open structures through which small molecules, such as water can diffuse. Preferably, the molecular sieves utilized in the pigmented dispersion are provided in an amount of about 0.2 to about 4.2 percent by weight of the total composition (about 0.5 to about 7 percent by weight of the pigmented dispersion).

While various ranges of dehydrating agents have been provided, the actual amount of the dehydrating agent to be added will be based on the calculated amount of water present in the pigmented slurry. Accordingly the actual amount of dehydrating agent may be outside of the aforementioned ranges.

In embodiments including a monomeric polyisocyanate and/or monomeric monoisocyanate dehydrating agent, addition of the polyol constituent to the pigmented slurry/monomeric polyisocyanate and/or monomeric monoisocyanate admixture results in an "extension" reaction. The preferred polyol and monomeric polyisocyanate and/or monomeric monoisocyanate react in the presence of the catalyst to form a pigmented paste including a reaction product comprising extended urethane polyols having unreacted hydroxyl groups. The polyol also scavenges any excess monomeric monoisocyanate. Exemplary polyols may include, without limitation, polycaprolactone polyol, polyester polyol, polytetramethylene ether glycol, polypropylene glycol, polyether diol, butane diol, and cyclohexane dimethanol. Mixtures of the aforementioned polyols may be utilized. Preferably, the polyol of the pigmented dispersion is provided in an amount of about 0.2 to about 5 percent by weight of the total composition (about 0.5 to about 7 percent by weight of the pigmented dispersion).

In embodiments including dehydrating agents comprising an orthoester, an organic solvent and distillation process, or molecular sieves, a polyol is not required. However, it is desirable to include a polyol as a dispersant and stabilizer for the pigments of the pigmented slurry.

An addition of organic solvent, preferably a VOC-exempt solvent for reasons of VOC reduction or elimination, is preferably made as needed to provide desired viscosity and flow properties to yield a homogenized admixture. The VOC-exempt solvent may again include dimethyl carbonate, propylene carbonate, methyl acetate, acetone, tertiary butyl acetate, and mixtures thereof. A VOC-containing solvent such as MAK, MEK, or ethyl hexyl acetate and mixtures thereof may also be used. The organic solvent may be in an amount within the preferred range of about 15 to about 60 percent by weight (based on the total composition) organic solvent included in the pigmented dispersion. Other additives may be provided to meet the requirements of the formulator.

A pigmented paste results from the above-mentioned process steps.

Processing to Yield Pigmented Dispersion

The pigmented paste is next processed, preferably by mechanical dispersion such as with a sand mill or high speed disperser, to form the pigmented dispersion.

Let Down

The water-reducible moisture-curing polyurethane coating composition is preferably formulated by admixing the pigmented dispersion with the let down. An exemplary let down comprises (1) water-reducible aliphatic polyisocyanate and (2) the balance of let down constituents. The balance of let down constituents may include a further addition of VOC-exempt organic solvent or other organic solvent, matting agent, flow agent, and further solvents. Other optional constituents may be provided in the let down.

Preferably, the water-reducible aliphatic polyisocyanate of the let down comprises about 5 to about 30 percent by weight of the total composition (about 40 to about 80 percent by weight of the let down). In embodiments, the water-reducible aliphatic polyisocyanate of the let down may comprise about 10 to about 20 percent by weight of the total composition (about 15 to about 65 percent by weight of the let down). A further preferred range of the water-reducible aliphatic polyisocyanate comprises about 12 to about 16 percent by weight of the total composition (about 25 to about 50 percent by weight of the let down). For ease of formulation, it is preferred that one or more VOC-exempt solvent is provided in the let down although this is not required because sufficient solvent(s) may be provided as a constituent or constituents of the pigmented dispersion. A preferred range of VOC-exempt organic solvent in the let down comprises about 5 to about 30 percent by weight of the total composition (about 10 to about 60 percent by weight of the let down). The remainder of the let down comprises the balance of the constituents. VOC-containing solvents may be utilized in the let down within the range provided for the VOC-exempt solvent, but are not preferred if a reduction in VOCs is desired.

The pigmented dispersion can include the urethane polyol reaction product in embodiments including a monomeric polyisocyanate or monomeric monoisocyanate dehydrating agent. In the presence of the catalyst, the water-reducible aliphatic polyisocyanate reacts with and consumes all of the hydroxyl groups of the urethane polyol reaction product of the pigmented dispersion to further extend the molecular weight of the urethane polyol reaction product to yield the moisture-curing polyurethane coating composition. The water-reducible aliphatic polyisocyanate of the let down also reacts with the polyol optionally provided in embodiments including a dehydrating agent such as orthoester, solvent, or molecular sieves.

The water-reducible aliphatic polyisocyanate of the let down is provided in an amount calculated to produce an excess of isocyanate groups in the finished composition. Such excess isocyanate groups react with atmospheric moisture to cure the composition to yield the finished-form film once the coating has been applied to a surface to be coated. The amount of the water-reducible aliphatic polyisocyanate is preferably selected so that the composition is flowable and has a low viscosity.

The aliphatic polyisocyanate must be water-reducible, that is the aliphatic polyisocyanate must be miscible (i.e., capable of being mixed) in water. In embodiments, the aliphatic polyisocyanate is chemically modified to be made hydrophilic so that the aliphatic polyisocyanate is made water-reducible.

Use of a water-reducible aliphatic polyisocyanate enables the pigmented dispersion and let down to form a water-reducible admixture which can be mixed with water during spray-application with a proportioning system. The water is preferably introduced to the spray gun of the proportioning system via a separate line. The water-reducible moisture-curing polyurethane coating composition does not gel or thicken when admixed with the water in the proportioning system.

The water-reducible aliphatic polyisocyanate can be one or more hydrophilic isocyanate or hydrophobic isocyanate. Mixtures of hydrophilic isocyanates or hydrophobic isocyanates may be utilized. Representative water-reducible aliphatic polyisocyanates include dimers, trimers and oligomers of hexamethylene diisocyanate, 1,6-hexamethylene-diisocyanate (HDI). Mixtures of such water-reducible aliphatic polyisocyanates may be used.

An addition of a VOC-exempt solvent may be made to the let down, or after the let down and pigmented dispersion are admixed, to impart desired viscosity and flow properties.

VOC-exempt solvents may include dimethyl carbonate, methyl acetate, acetone, tertiary butyl acetate. Mixtures of such solvents may be used.

Preferably, the total amount of VOC-exempt solvent present in the total water-reducible moisture-curing polyurethane coating composition (pigmented dispersion and let down) is about 15 to about 60 percent by weight of the total composition. It is contemplated that the upper end of the VOC-exempt solvent range, in particular, may be modified as needed by the formulator to impart desired viscosity and flow properties.

Further optional additives well known in the paint processing art may be provided as part of the balance of constituents comprising the let down. Such additives may include one or more acid catalyst (e.g., butyl acid phosphate) ultraviolet light stabilizer, wetting agent, and agents to increase slip and flow. Such optional additives may be included as constituents of the pigmented slurry, although this is not in any way required. Typically, these optional additives are provided in an amount of between about 0.02 to about 3.0 percent by weight of the total composition (about 0.04 to about 6.0 percent by weight of the let down.)

Optionally, the let down may include a matting, or flattening, agent. The matting agent may be one or more polyolefin. The polyolefin is most preferably admixed with the let down before admixing of the pigmented dispersion and let down, although this mixing order is not required. The polyolefin constituent facilitates formation of a matte appearance in the finished-form film of the coatings. Because the polyolefin is hydrophobic and does not include water, the polyolefin could be added to other constituents of the coating composition, such as to the pigmented dispersion. The polyolefin may comprise about 5 to about 25 percent by weight of the total coating composition.

A polyolefin preferably comprises polymerized fully or partially saturated branched and straight chain polyolefin monomers having a range of between about two to about four carbon atoms. Mixtures of two or more polyolefins may be used. In embodiments, the polyolefin is polyethylene wax and polypropylene wax. Mixtures of polyethylene wax and polypropylene wax may be utilized. As is known, most commercial polyolefin products comprise distribution products with a major fraction having a specified number of carbon atoms. Such distribution products are suitable for use in the moisture-curing polyurethane coating compositions.

Polyolefins formed of monomers having fewer than four carbon atoms are believed to be more efficacious because such polyolefins are highly resistant to solubilization with solvents typically used to formulate the coating compositions. Polyolefins are further advantageous because they are inert and advantageously avoid unwanted side reactions with polyisocyanates which can occur during storage.

The polyolefin is preferably micronized with a particle size diameter, determined on a weight basis, of between about 5μ to about 100μ. The polyolefin may be used in place of (or in combination with) crystalline silicas and other matting agents typical of conventional polyurethane coatings. The polyolefin may be used in low enough amounts so as to be below the critical pigment volume concentration (CPVC) of the composition thereby avoiding any detrimental effect on flow properties typical of many known matting agents.

Other optional flattening agents may be provided to influence the matte appearance of the finished-form film of the coatings. These optional flattening agents may include mica, talc, calcium carbonate, and clays. Such flattening agents are preferably included as a constituent of the pigmented slurry particularly where dehydration of any water associated with the flattening agent is required. The flattening agents can be added in amounts as required to meet the needs of the formulator. A preferred type of optional mica comprises wet-ground mica having a maximum particle size diameter of about 100μ.

The pigment or pigments will be selected based on the desired application for the coating compositions. The pigments may be blended as required to produce the desired color. Representative pigments can include titanium dioxide from Tioxide Americas, Inc. of The Woodlands, Tex., chrome oxide green from Rockwood Pigments of East St. Louis, Ill., and yellow oxide from Lanxess Corporation of Pittsburgh, Pa.

The VOC-exempt solvent dimethyl carbonate is available from Nexeo Solutions of Covington, Ky. Methyl acetate, tertiary butyl acetate, and acetone are available from known commercial sources.

Monomeric polyisocyanates such as IPDI and HDI are commercially available from Bayer Material Sciences, Inc of Pittsburgh, Pa. MDI is available in monomeric and polymeric forms from Huntsman Polyurethanes, Auburn Hills, Mich., under the tradename Rubinate®. TDI and TMDI are available from Degussa Corporation of Parsippany, N.J. Sigma-Aldrich Co. is a source of the monoisocyanate pTSI.

Catalysts are available from various commercial sources. Dibutyltin dilaurate, an exemplary organometallic catalyst, is available from Air Products and Chemicals, Inc. of Allentown, Pa., under the tradename Dabco T-12.

Representative tertiary amine catalysts include, but are not limited to, Desmorapid PP available from Bayer Corporation and triethylene diamine, pentamethyl diethylene triamine each of which is available from Sigma-Aldrich Co. LLC.

Representative molecular sieves are preferably modified zeolites designated as 4A, 5A, 10X and 13X available from Sigma-Aldrich Corp. 5A (angstrom) modified zeolites are preferred.

Sigma Aldrich is a source of orthoesters.

Polyols, are well known in the art and are readily available in the marketplace. Useful polyols include, but are not limited to, polycaprolactone polyols such as TONE-0210 available from Perstrop Polyols, Inc. of Toledo, Ohio, Diexter G polyester polyol from COIM USA of West Deptford, N.J. POLYMEG brand polytetramethylene ether glycols available from Lyondell Chemical Company of Houston, Tex., polypropylene glycols, low priced polyethers, polyester diols such as Bayer Desmophen 1700, 1,4-butanediol, a short chain alkylene diol such as used in conjunction with other long chain diols to produce tough and abrasion resistant coatings and 1,4 cyclohexane dimethanol available from Eastman Chemicals of Kingsport, Tenn.

The water-reducible aliphatic polyisocyanate of the let down may comprise polyisocyanates (which are basic raw materials in the manufacture of moisture-curing polyurethanes) having very low monomer content. Preferred polyisocyanates include, but are not limited to, Bayhudur 302, a water-dispersible polyisocyanate based on hexamethylene diisocyanate (HDI), from Bayer Corporation of Pittsburgh, Pa., Bayhudur 303 polyisocyanate hardener from Bayer Corporation of Pittsburgh, Pa., Basonat HW100 polyisocyanates based on isocyanurated hexamethylene diisocyanate from BASF of Wyandotte, Mich., and Rhodocoat WT 2102, an aliphatic polyisocyanate from Perstorp Corporation of Freeport, Tex. It is desirable to manufacture water-reducible moisture-curing polyurethane coating compositions using these preferred polyisocyanates for the following reasons: (1) they offer the lowest possible monomer contents; and (2) they are of the lowest possible viscosities and hence require less solvent reducing the cost in the final product.

Commercial sources of representative polyolefins include Propyltex 270S polypropylene wax available from Micro Powders, Inc. of Tarrytown, N.Y. and Shamrock SPP-25 polyproplyene wax available from Shamrock Technologies of Newark, N.J.

An exemplary flow agent is Byk-320 available from Byk Chemie USA of Wallingford, Conn. A dispersing agent such as Anti-Terra-U 100 from Byk Chemie USA may be included as an optional additive. Dispersing agents generally may be selected from the group consisting of cationic, anionic, and nonionic dispersing agents, and mixtures thereof. Thixotropes may include modified bentonites, fumed silicas, modified polyethylene, and polyamides. A thixotrope such as Bentone 27 from Elementis Specialties of Highstown, N.J. may be provided.

A mica is CD-2200 mica available from Georgia Industrial Minerals of Sandersville, Ga. A synthetic silica is Gacil HP39 available from INEOS Silicas of Joliet, Ill. Other optional additives may include a hindered amine light stabilizer such as Hostavin 3055 available from Clariant Corporation of Coventry, R.I. and acid catalysts such as butyl acid phosphate available from Asheville Lubricants of Asheville, N.C.

Methods of Making Coating Compositions

Exemplary methods of making water-reducible single-component moisture-curing polyurethane coating compositions will now be described. The exemplary methods and coating compositions are not intended to be exhaustive or to limit the invention to the precise forms disclosed. The illustrative methods and embodiments are chosen and described in order to best explain the principles of the invention and its application and practical use to thereby enable others skilled in the art to best utilize the invention.

Water-reducible single-component moisture-curing polyurethane coating compositions are preferably made according to a batch process.

Preparation of Pigmented Slurry

In a first step of an exemplary method, a pigmented slurry is prepared. An exemplary pigmented slurry comprises one or more pigment, one or more solvent, and optional constituents to impart desired properties. A catalyst constituent may be added to the pigmented slurry or may be added in a subsequent step.

The pigment or pigments will be selected based on the desired application for the coating compositions and may be blended as required to produce the desired color. Pigments may be in the form of a powder or a predispersed tint base or a combination of both. Pigments typically include water which is removed in a subsequent dehydration step.

An exemplary VOC-exempt solvent may comprise dimethyl carbonate, methyl acetate, acetone, tertiary butyl acetate. Solvent mixtures may be used. Dimethyl carbonate is a particularly preferred solvent.

Dibutyltin dilaurate is a preferred catalyst. Triethylene diamine is also a suitable catalyst.

The constituents used to formulate the pigmented slurry are added to a jacketed tank well known in the art and commonly used in the making of paints and other types of protective coatings. In an embodiment, the wet raw materials are weighed out into the jacketed tank. The wet raw materials may include the solvent and a flow agent (e.g., Byk 320) and dispersing agent (e.g., Anti-Terra-U 100). The jacketed tank may be put under a Cowles® mixer to mix the constituents at a low speed.

Optionally, one or more polyolefin may be included in the jacketed tank. Other optional constituents may include "fillers" such as mica, talc, calcium carbonate, and clays provided to influence the matte appearance of the finished-form film produced by the water-reducible single-component moisture-curing polyurethane coating compositions. Further examples of optional constituents may include hindered amine light stabilizers (e.g., Hostavin 3055) additional solvents, and thixotropes (e.g., Bentone 27).

Next, the pigment or pigments are added to the jacketed tank. The mixing speed provided by the mixer is increased slowly to form the pigmented slurry. The agitation provided by the mixer forms a homogenous mixture. At a high speed, the pigmented slurry will generate heat. When the temperature reaches 130° F., a small sample is withdrawn to test its moisture content by means of the Karl-Fischer titration test, well known in the art, or by other methods well known in the art. The moisture or water is contained in the admixture of the pigment, solvent, and other constituents used to formulate the pigmented slurry. The amount of water present in the pigmented slurry is calculated from the results of the test sample.

The above-described mixing order is exemplary and the constituents used to formulate the pigmented slurry may be added to the jacketed tank in no particular order. The catalyst is not required for formulation of the pigmented slurry and may be added at any time before the dehydration reactions using monomeric polyisocyanates and/or monomeric monoisocyanates as described below.

The materials comprising the pigment, and optional additives provided for use in the pigmented slurry, are well known in the art and are readily available in the market. Although the optional additives are well known in the art, special attention must be paid to their compatibility and/or reactivity with the water-reducible aliphatic polyisocyanate added when the pigmented dispersion and let down are admixed.

Dehydration of Pigmented Slurry to Yield Pigmented Paste

In a next step of the exemplary method, water is removed from the pigmented slurry and the pigmented slurry is dehydrated. Water may be removed from the pigmented slurry in various ways.

In embodiments including a monomeric polyisocyanate or monomeric monoisocyanate dehydrating agent, the pigmented slurry can be dehydrated according to the following process.

Monomeric Polyisocyanate Dehydrating Agent

In embodiments, a monomeric polyisocyanate dehydrating agent, preferably comprising the monomeric diisocyanate IPDI, is calculated to completely consume the water present in the pigmented slurry. IPDI is well known for its moisture eliminating qualities. It is known that twelve and one third (12.33) parts by weight of the monomeric diisocyanate IPDI will consume one (1) part by weight of water of the pigmented slurry. Therefore, based on the amount of water found by means of the Karl-Fischer titration test, the amount of IPDI needed to dehydrate the water of the pigmented slurry can be calculated according to the following formula:

$$\frac{(moisture) \times (wt.\ of\ batch)}{100} =$$

$$(lbs.\ of\ water) \times (equivalent\ wt.\ of\ IPDI) =$$

$$lbs.\ of\ IPDI + excess\ IPDI$$

If any other additives are used that include or bring with them other materials that react with isocyanate, then additional IPDI may have to be used for complete dehydration of the pigmented slurry. The monomeric diisocyanate comprising the monomeric polyisocyanate constituent is added to the pigmented slurry separately or with the catalyst if the catalyst is not already present in the pigmented slurry. The catalyst drives the dehydration reaction between the pigmented slurry and the monomeric diisocyanate.

An additional amount of the monomeric diisocyanate is added to the pigmented slurry resulting in an excess of the monomeric diisocyanate. The additional amount of monomeric diisocyanate is selected based on the nature of the hydrogen donor that will be added later in the process as described below.

The pigmented slurry, catalyst, and the preferred monomeric diisocyanate are continuously agitated by the mixer in the jacketed tank at between about 130-140° F. until the dehydration reaction is complete or has reached the desired level; that is, elimination of the water (i.e., dehydration) from the pigmented slurry is complete. After about one hour, another syringe sample is taken for moisture. The moisture content should be below 0.030.

When the dehydration is complete, an amine titration test, well known in the art, may be used to confirm the amount of excess monomeric diisocyanate remaining in the pigmented slurry.

Monomeric Monoisocyanate Dehydrating Agent

In a further embodiment, a monomeric monoisocyanate dehydrating agent can be utilized to dehydrate the pigmented slurry in the same manner as the exemplary monomeric polyisocyanate described above. By way of example, a monomeric monoisocyanate dehydrating agent such as pTSI is calculated to completely consume the water present in the pigmented slurry according to the Karl-Fischer titration test and based on the same ratio and formula as described above.

An additional amount of the monomeric monoisocyanate is added to the pigmented slurry resulting in an excess of the monomeric monoisocyanate. The additional amount of monomeric monoisocyanate is selected based on the nature of the hydrogen donor that will be added later in the process as described below.

The pigmented slurry, catalyst, and the preferred monomeric monoisocyanate are continuously agitated by the mixer in the jacketed tank as described above in connection with the monomeric diisocyanate embodiment. The moisture content should be below 0.030. Upon completion of the dehydration, an amine titration test, well known in the art, may be used to confirm the amount of excess monomeric monoisocyanate remaining in the pigmented slurry.

Polyurea is a byproduct of the dehydration reaction of the pigmented slurry and monomeric polyisocyanate dehydrating agent and polyamide is a byproduct of the dehydration reaction of the pigmented slurry and preferred pTSI monoisocyanate dehydrating agent. The polyurea and polyamide are not consumed in the subsequent steps and are present in the water-reducible single-component moisture-curing polyurethane coating compositions.

Other Dehydrating Agents

In other embodiments, the dehydrating agent comprises one or more orthoester, such as trimethyl orthoformate. The orthoester dehydrating agent is added to the tank at room temperature. The amount of orthoester dehydrating agent utilized is determined using the Karl-Fischer test in the same manner as the exemplary polyisocyante described above. A calculated excess of the orthoester is provided to ensure that all, or essentially all, of the water is eliminated. Any excess orthoformate is removed by evaporation. Ethanol is formed as a byproduct of the dehydration reaction with the orthoester.

In yet other embodiments, the dehydrating agent comprises one or more solvent followed by heating and distillation to dehydrate the pigmented slurry. Toluene is an exemplary solvent known for its ability to drive off water. The amount of solvent utilized is determined using the Karl-Fischer test in the same manner as the exemplary polyisocyante described above. In an embodiment, a calculated amount of toluene in excess of the water present in the pigmented slurry is admixed with the pigmented slurry in the jacketed tank. The jacketed tank is sealed by covering with a lid and a fractionating column. A suitable condenser is attached to the fractionating column. The pigmented slurry is next heated to vaporize the water and solvent admixture into the fractionating column. The water and toluene are subsequently condensed and removed in a manner well known to those of skill in the art leaving the dehydrated pigmented slurry in the jacketed tank. The temperature and time of heating will depend on the solvent selected.

In still other embodiments, the dehydrating agent may comprise one or more molecular sieve. In embodiments, the molecular sieve may comprise 5A modified zeolites. The molecular sieves are added to the tank at room temperature after determination of the water content by the Karl-Fischer method described previously. A calculated excess of the molecular sieve material is provided to ensure that all, or essentially all, of the water is adsorbed by the molecular sieve material. The molecular sieves remain in the water-reducible moisture curing polyurethane coating.

For all embodiments, care must be taken to prevent contact between atmospheric moisture and the substantially-dehydrated pigmented slurry going forward. The coating composition is maintained under a nitrogen blanket and the jacketed tank is sealed.

For embodiments incorporating monomeric polyisocyanate or monomeric monoisocyanate dehydrating agent, the next step of the exemplary method results in production of a pigmented paste. The pigmented paste is produced by an extension reaction which occurs when a polyol constituent such as Diexter G polyester polyol is admixed with the pigmented slurry, catalyst, and excess of the preferred monomeric diisocyanate or pTSI.

The admixture is agitated at high speed by the mixer in the jacketed tank at between about 130° F. and about 140° F. until the excess monomeric diisocyanate or pTSI is consumed by the polyol constituent to form the pigmented paste.

The addition of the polyol results in the extension reaction previously described. The products of this reaction are long chain polyols with urethane backbones, also referred to herein as urethane polyols. Such urethane polyols are extended in molecular weight as a result of the reaction. The long chain urethane polyols have an excess of hydroxyl groups available for reaction with the water-reducible aliphatic polyisocyanate to yield the water-reducible single-component moisture-curing polyurethane coating compositions. The catalyst catalyzes the extension reaction between the excess monomeric diisocyanate or pTSI and the preferred polyol constituent.

The complete consumption of the preferred monomeric diisocyanate or pTSI by the preferred polyol constituent can be confirmed with either an amine titration test or a centrifuged sample scanned on an infrared spectrophotometer well known in the art, or by other means well known in the art. As noted elsewhere, the polyurea or polyamide formed in the dehydration reaction remains in the color pigmented slurry following the above-described extension reaction.

Complete consumption of the preferred monomeric diisocyanate or pTSI advantageously decreases or eliminates any potential toxicity of the pigmented paste and water-reducible single-component moisture-curing polyurethane coating compositions. The preferred monomeric diisocyanate or pTSI are highly effective in eliminating water from the pigmented slurry yet the calculated excess of the monomeric diisocyanate or pTSI is toxic. The calculated excess of the monomeric diisocyanate or pTSI is used to advantage, however, to extend the low equivalent weight polyol into long chain polyols with tough urethane backbones with a higher equivalent weight. The excess monomeric diisocyanate or pTSI is consumed in the process, reducing or eliminating any toxicity in the water-reducible single-component moisture-curing polyurethane coating compositions.

For embodiments incorporating orthoester, solvent, or molecular sieve dehydrating agents, a polyol is optionally admixed with the pigmented slurry as a dispersant and stabilizer for the pigments of the pigmented slurry. A suitable polyol for this purpose is Diexter G polyester polyol. Addition of the polyol results in a finished-form pigmented paste. The polyol remains in the pigmented paste following the addition.

Processing to Yield Pigmented Dispersion

In a next step of the exemplary method, the resultant pigmented paste is processed to produce a pigmented dispersion. The pigmented paste can be dispersed in any of the customary dispersion equipment well known in the art, resulting in the pigmented dispersion. Typically, mechanical dispersion such as with a sand mill or high speed disperser will be utilized to disperse the pigmented paste to form the pigmented dispersion. Caution must be exercised to prevent contamination of the resultant pigmented dispersion by atmospheric and other sources of moisture from this stage on.

Formulation of Coating

In a final step of the exemplary method, a water-reducible single-component moisture-curing polyurethane coating composition is produced by admixture of the pigmented dispersion with a let down including the water-reducible aliphatic polyisocyanate. The water-reducible aliphatic polyisocyanate may, for example, be based on 1,6-hexamethylene-diisocyanate. Optionally, a polyolefin matting agent may be added to the admixture. The pigmented dispersion and water-reducible aliphatic polyisocyanate are admixed by high speed dispersion in a tank in a manner well known in the art and commonly used in the making of paints and other types of protective coatings. The coating can then be packaged in sealed buckets taking care not to expose the coating to atmospheric moisture.

Application of Coating

Water-reducible single-component moisture-curing polyurethane coating compositions may be spray applied to a surface to be coated with any suitable spray-type proportioning system. An example is a Graco® ProMix® Easy spray-type proportioning system. Use of a spray-type proportioning system enables water-reducible single-component moisture-curing polyurethane coatings to be atomized and mixed with a water stream in an appropriate ratio to control viscosity of the coating. In preferred embodiments, water-reducible single-component moisture-curing polyurethane coating compositions may be reduced according to a ratio of 1 part coating to about 0.4 to 0.6 parts water, although ratios above and below this range may be utilized. A ratio of 1 part coating to about 0.4 parts water is particularly preferred.

Once applied to the object, water-reducible single-component moisture-curing polyurethane coating compositions react with atmospheric moisture to cure and form a film on a surface to which the water-reducible single-component moisture-curing polyurethane coating composition is applied. The resultant film may have desired low levels of gloss and sheen.

Water used for the spray application evaporates rapidly due to the theorized azeotropic effect resulting from the combination of the solvent or solvents utilized in the water-reducible single-component moisture-curing polyurethane coating composition and water used to reduce the coating during application. The water evaporation occurs rapidly even for coating builds exceeding 11 mils DFT. Evaporation of the water limits carbon dioxide gas formation. Reduction of carbon dioxide gas formation results in a finished-form film which is free or substantially free of surface imperfections, such as blistering and crazing. Rapid water evaporation accelerates the rate of cure limiting flow of the coating composition on the object and minimizing or avoiding sagging-type surface imperfections.

Optionally, water-reducible single-component moisture-curing polyurethane coating compositions may be applied with applicators other than a spray-type proportioning system. For example, water-reducible single-component moisture-curing polyurethane coating compositions can be applied with a paint brush or a paint roller.

For embodiments including a monomeric polyisocyanate or monomeric monoisocyanate dehydrating agent and a polyol, the polyol chosen to react with the monomeric polyisocyanate or monomeric monoisocyanate of the pigmented slurry to form the pigmented paste is influenced by a number of factors. These factors include: (1) the nature of the water-reducible aliphatic polyisocyanate selected for formation of the water-reducible single-component moisture-curing polyurethane coating compositions and (2) the properties that are desired in the final form water-reducible single-component moisture-curing polyurethane coating compositions.

The properties of any water-reducible single-component moisture-curing polyurethane coating composition, such as flexibility, hardness and chemical resistance, are greatly influenced by the functionality and equivalent weight of the water-reducible aliphatic polyisocyanate used in making the water-reducible single-component moisture-curing polyurethane coating compositions. Accordingly, control of the functionality and equivalent weight of the water-reducible aliphatic polyisocyanate permits the operator to formulate soft and flexible coatings, or hard and tough coatings, as required for a particular end use.

Functionality is defined as the number of functional isocyanate groups per molecule. Difunctional polyisocyanates (two isocyanate groups per molecule) generally produce (all else being equal) soft, flexible and rubbery coatings. Polyisocyanates having a functionality of more than two (more than two isocyanate groups per molecule) produce harder and tougher films.

Equivalent weight is the equivalent weight of the polyisocyanate utilized for the water-reducible aliphatic polyisocyanate, a factor which influences the properties of the final coating. Polyisocyanates having a high equivalent weight produce a less brittle coating than a low equivalent weight polyisocyanate. In embodiments, it is considered preferable to have an equivalent weight of 500 to 3000 for the urethane polyols formed by the reaction of the excess monomeric polyisocyanate or monomeric monoisocyanate and polyol when selecting the water-reducible aliphatic polyisocyanate. However, the specific equivalent weight of the urethane polyol will be selected based on the desired properties of the water-reducible single-component moisture-curing polyurethane coating compositions such as flexibility, durability, chemical resistance, abrasion resistance, etc.

The functionality and equivalent weight of the water-reducible single-component moisture-curing polyurethane coating compositions can be controlled by properly choosing either the polyol or the water-reducible aliphatic polyisocyanate. In other words, a low equivalent weight water-reducible aliphatic polyisocyanate can be converted to a high equivalent weight moisture-curing polyurethane by partially reacting it with a high equivalent weight difunctional polyol, thus achieving increased flexibility. Also, if a difunctional polyisocyanate is provided for use as a water-reducible aliphatic polyisocyanate, it can be converted into a trifunctional water-reducible single-component moisture-curing polyurethane coating compositions by choosing a trifunctional polyol as its co-reactant, thus achieving increased toughness in the final water-reducible single-component moisture-curing polyurethane coating compositions.

The choice of the preferred polyol, the monomeric diisocyanate or monomeric monoisocyanate, the water-reducible aliphatic polyisocyanate and the catalyst described herein and illustrated in the following examples represent some of the many combinations that can be used. For instance, if a difunctional polyisocyanate resin is selected for use as the water-reducible aliphatic polyisocyanate, then slightly branched polyols can be used.

Exemplary water-reducible single-component moisture-curing polyurethane coating compositions have the potential for numerous advantages. These advantages include: (1) permitting formulation of the coating as a one-component, ready to use system thereby freeing the user from any requirement to mix separate components before use; (2) providing a coating with a finished-form film which is nearly or completely free of surface imperfections, particularly blistering, crazing and sagging type surface imperfections even with coating builds exceeding 11 mils wet; (3) providing a coating which can have a shortened or comparable drying time when compared with existing single and plural component moisture-curing polyurethane coating compositions; (4) providing a coating which can cure under ambient conditions without resort to heat sources; (5) providing a coating with little or no VOC emissions, both in the composition and by avoiding any requirement for reduction with an organic solvent during spray application; (6) providing a coating which may be spray applied with conventional proportioning systems; (7) providing a coating which may be admixed with water to modify coating viscosity, particularly when applied with a proportioning system; (8) providing a coating with the potential for highly controlled gloss and sheen properties; and (9) providing a coating with ease of incorporation of a wide range of pigments into the coating composition thereby improving aesthetics, durability, viscosity, corrosion resistance and ease of color matching.

A further advantage is that organometallic catalysts may be used in formulation of the polyurethane coating composition. Organometallic catalysts are effective catalysts but tend to increase the gloss and sheen of the film. Polyolefin matting agents are sufficiently effective to overcome the effect of the organometallic catalysts.

As previously mentioned, latitude in formulation of the compositions enables the formulator to use a minimum number of raw materials to obtain a broad range of water-reducible single-component moisture-curing polyurethane coating compositions. In embodiments, the present water-reducible single-component moisture-curing polyurethane coating compositions incorporate the ability to change the quantity of excess monomeric diisocyanate used followed by a corresponding change in the quantity, equivalent weight, and functionality of the polyol used, allowing the quantity of catalyst to be varied. In such embodiments, the result is that the number and length of "bridges" between the molecules of polyisocyanate are controllable making the water-reducible single-component moisture-curing polyurethane coating compositions more or less flexible depending on the nature of change made in the quantity of the excess monomeric diisocyanate used and the corresponding changes in the preferred polyol. Formulating latitude is also enhanced by the ability to add catalyst to the admixture of the pigmented dispersion and water-reducible aliphatic polyisocyanate to allow for tight control over the curing, or drying, time.

EXAMPLES

Water-reducible single-component moisture-curing polyurethane coating compositions are further described in connection with the following nonlimiting examples.

Examples 1-6

Exemplary water-reducible single-component moisture-curing polyurethane coating compositions were evaluated for time required to dry or cure. The exemplary water-reducible single-component moisture-curing polyurethane coating compositions were evaluated against control compositions comprising single- and plural-component moisture-curing coatings compliant, respectively, with U.S. Department of Defense specification MIL-DTL-53039D and MIL-DTL-64159B. Examples 1-6 illustrate that water-reducible single-component moisture-curing polyurethane coating compositions have favorable drying properties enabling the coating process to be completed more rapidly and at a lower cost. Examples 1-6 include observations of time for the coating compositions to: (1) set to touch, (2) dry hard, (3) dry through, and (4) complete the cure.

Coating Compositions

A 100 gram sample of each of Examples 3-6 was formulated in the following manner. A pigmented dispersion was first prepared. In Examples 3-6, the first step in preparing the pigmented dispersion was to prepare a pigmented slurry. Table 1 lists the constituents comprising the pigmented slurry, including optional dispersing agents and a thixotrope. The pigmented dispersion for each of Examples 3-6 included a VOC-exempt solvent as listed in Table 4. Table 1 provides weight percentages based on the pigmented slurry and total composition.

TABLE 1

| | | Pigmented Slurry | | | |
|---|---|---|---|---|---|
| No. | Constituent/Source | Description | Amount (grams) | Wt % (Pigmented Slurry) | Wt % (Total Composition) |
| 1 | VOC-exempt solvent (Table 4) | Solvent | 16.43 g | 40.70% | 16.43% |
| 2 | Anti-Terra-U100 (Byk-Chemie USA, Wallingford, CT) | dispersing agent | 0.89 g | 2.20% | 0.89% |
| 3 | Byk 320 (Byk Chemie USA, Hartford, CT) | flow agent | 0.08 g | 0.20% | 0.08% |
| 4 | Bentone 27 (Elementis Specialties, Highstown, NJ) | Thixotrope | 0.80 g | 2.00% | 0.80% |
| 5 | Titanium dioxide TR93 (Tioxide Americas, Inc. The Woodlands, TX) | color pigment | 22.17 g | 54.92% | 22.17% |
| | TOTAL Pigmented Slurry | | 40.37 g | 100% | 40.37% |

Examples 1 and 2 were selected as controls for comparison and are not compositions according to the invention. Example 1 was a single-component moisture-curing polyurethane coating composition compliant with MIL-DTL-53039D. Example 2 was a prior art plural-component moisture-curing polyurethane coating compliant with MIL-DTL-64159B. Examples 1 and 2 were of a tan color known as Tan 686A. Both Examples 1 and 2 represented excellent coatings.

Examples 3-6 represent exemplary water-reducible single-component moisture-curing polyurethane coating compositions in accordance with the invention. The exemplary compositions of Examples 3-6 comprised about 60 percent by weight of a pigmented dispersion and about 40 percent by weight let down including a water-reducible aliphatic polyisocyanate.

The water-reducible single-component moisture-curing polyurethane coating compositions of Examples 3-6 were for a paint identified as "Aircraft White" FED 37875 a paint that could be applied to many different objects such as helicopters, fixed-wing aircraft, and on and off road vehicles. The water-reducible single-component moisture-curing polyurethane coating composition was identical for each of Examples 3-6 except that the solvent was as indicated in Table 4. Observations regarding the drying time of the cured finished-form film for each of Examples 1-6 are provided.

A jacketed container and Cowles mixer were provided. The pigmented slurry constituents listed in Table 1, including pigment, VOC-exempt solvent, catalyst, optional dispersing agent (Anti-Terra-U100), flow agent (Byk 320) and an optional thixotrope (Bentone 27) were admixed in the jacketed container in the amounts listed in Table 1. The catalyst is provided to accelerate the rate of the dehydration and extension reactions described below. The constituents were mixed at high speed to develop heat to about 130° F. to form the pigmented slurry. Persons of skill in the art will appreciate that the constituents of the pigmented slurry may vary depending on the requirements of the end user. For example, the pigments selected will determine the color of the finished-form film.

Next, a pigmented paste was produced by dehydrating the pigmented slurry and by adding a polyol and other constituents. The dehydration reaction was performed in the following manner. Following production of the pigmented slurry, a small sample was drawn and tested for water content using the Karl-Fischer method. Based on the results, 1.30 g of a monomeric polyisocyanate in the form of isophorone diisocyanate (IPDI) was added to completely react with and eliminate all water in the pigmented slurry. It was further determined that an additional 0.38 g of IPDI should be added so as to produce useful urethane polyols when reacted with the polyol as described in the extension reaction described below. A dibutyltin dilaurate catalyst (Durastab LT-2) was also added. Table 2 lists the constituents added to the pigmented slurry in the dehydration reaction step.

TABLE 2

Pigmented Dispersion With Isocyanate and Polyol Constituents

| No. | Constituent/Source | Description | Amount (grams) | Wt % (Pigmented Paste/ Dispersion) | Wt % (Total Composition) |
|---|---|---|---|---|---|
| Dehydration Reaction | | | | | |
| 6 | Pigmented Slurry (Table 1) | * * * | 40.37 g | 70.60% | 40.37% |
| 7 | Isophorone diisocyanate (IPDI) (Desmodur IPDI Vestanat Brenntag Great Lakes, Wauwatosa, WI) | dehydration reagent | 0.30 g | 0.52% | 0.30% |
| 8 | Isophorone diisocyanate (IPDI) (excess of amount required for dehydration reaction) | polyol extender | 0.38 g | 0.66% | 0.38% |
| 9 | Durastab LT-2 (Dura Chemicals, Inc. Emeryville, CA) | Catalyst | 0.22 g | 0.38% | 0.22% |
| Extension Reaction | | | | | |
| 10 | Diexter-G TMPD-120 (COIM USA West Deptford, NJ) | Polyol | 1.70 g | 3.0% | 1.70% |
| 11 | VOC-exempt solvent (Table 4) | Solvent | 14.22 g | 24.86% | 14.22% |
| | TOTAL-Pigmented Dispersion | | 57.19 g | 100% | 57.19% |

The agitation was continued for 60 minutes and a fresh sample was tested as before for water content. The concentration of water was found to be less than 0.01% indicating that the pigmented slurry was sufficiently dehydrated. At this stage, the temperature of the slurry was found to be between 150-160° F.

Next, an extension reaction was performed. 1.70 grams of Diexter-G TMPD-120, a polyester polyol, was added to the slurry and the agitation continued. A further addition of VOC-exempt solvent from Table 4 was added. Table 2 lists the constituents added to the pigmented slurry in the extension reaction step.

After approximately 60 minutes, a small sample was withdrawn and centrifuged to separate the resin (Diexter-G TMPD-120/IPDI extended urethane polyol) from the pigments. The supernatant layer was analyzed for the presence of isocyanate in an infrared spectrophotometer (Perkin-Elmer, Model 1430, Norwalk, Conn.).

A characteristic small band was detected at approximately the 2775 cm$^{-1}$ wavelength indicating the presence of unreacted IPDI in the pigmented slurry. The mixing of the slurry was continued for an additional hour and the slurry was re-checked for the presence of IPDI. IPDI was not detected. Consumption of the IPDI indicated completion of the extension reaction process and formation of the extended polyol urethanes.

A pigmented paste was produced by the preceding reactions and steps. The pigmented paste including the extended urethane polyols was mechanically agitated by running the paste through a high speed disperser to eliminate all pigment agglomerates. This is a common practice in the coating industry.

Processing of the pigmented paste produced a pigmented dispersion.

Next, the pigmented dispersion and let down, including water-reducible aliphatic polyisocyanate, optional polyolefin matting agent, and other optional constituents were admixed. Table 3 lists the constituents.

TABLE 3

Base Formulation Water-reducible Single-Component Moisture-curing Polyurethane Coating Composition

| No. | Constituent/Source | Description | Amount (grams) | Wt % (Total Composition) |
|---|---|---|---|---|
| 12 | Pigmented Dispersion (Table 2) | * * * | 57.19 g | 57.19% |
| 13 | Rhodocoat WT 2102 (Perstorp Polyols, Inc. Toledo, OH) | water-reducible aliphatic polyisocyanate | 14.12 g | 14.12% |
| 14 | VOC-exempt solvent (Table 4) | Solvent | 11.69 g | 11.69% |
| 15 | Shamrock SPP-25 polyproplyene (Shamrock Technologies, Newark, NJ) | matting agent | 16.60 g | 16.60% |
| 16 | Hostavin 3055 (Clariant Corp., Coventry, RI) | hindered amine light stabilizer | 0.36 g | 0.36% |
| 17 | Butyl Acid Phosphate | acid catalyst | 0.04 g | 0.04% |
| | TOTAL | | 100 g | 100% |

Referring to Table 3, the let down included a water-reducible aliphatic polyisocyanate (Rhodocoat WT 2102), a further addition of VOC-exempt solvent of the type listed in Table 4, a polypropylene matting agent (Shamrock SPP-25), a hindered amine light stabilizer (Hostavin 3055), and an acid catalyst (butyl acid phosphate) in the amounts listed in Table 3. The pigmented dispersion, water-reducible aliphatic polyisocyanate, and VOC-exempt solvent were agitated under a nitrogen blanket for 15 minutes followed by addition of the polypropylene matting component, flow agent, and solvent. The formulated exemplary water-reducible single-component moisture-curing polyurethane coating compositions were homogenized to complete the manufacturing process.

Table 4 lists the four solvents evaluated in accordance with the formulations of Examples 3-6 described above.

TABLE 4

Solvents

| Example No. | Solvent/Source | Amount (grams) | Wt. % (Total Composition) |
|---|---|---|---|
| 3 | Dimethyl carbonate (Nexeo Solutions, Covington, KY) | 42.34 g | 42.34% |
| 4 | Methyl acetate | 42.34 g | 42.34% |
| 5 | Acetone | 42.34 g | 42.34% |
| 6 | Tertiary butyl acetate | 42.34 g | 42.34% |

Exemplary compositions according to Examples 1-6 were each separately spray-applied to a flat Bonderite 1000 steel panel with a plural-component proportioning system at a ratio of 1 part water-reducible single-component moisture-curing polyurethane coating to 0.4 part water to produce a coating thickness of about 2 to about 4 mils DFT. Each coating was permitted to cure at about 75° F. and about 30% relative humidity. No external heat source was provided. Measurements were taken of the time to dry for each of the coating compositions of Examples 1-6.

An evaluation of the drying time of each coating composition was made by touch with a human finger in accordance with ASTM D 1640. The drying time data are presented in Table 5.

TABLE 5

Examples 1-6 - Drying Time

| Example No. | Coating | Set To Touch (Hours) | Dry Hard (Hours) | Dry Through (Hours) | Complete Cure (Days) |
|---|---|---|---|---|---|
| 1 | MIL-DTL-64159B | 1 | 6 | 8 | 7 |
| 2 | MIL-DTL-53039D | 0.5 | 3 | 4 | 7 |
| 3 | Water-reducible moisture-curing polyurethane coating with dimethyl carbonate solvent | 0.5 | 1 | 2 | 7 |
| 4 | Water-reducible moisture-curing polyurethane coating with methyl acetate solvent | 3 | 4 | 6 | 7 |
| 5 | Water-reducible moisture-curing polyurethane coating with acetone solvent | 3 | 4 | 6 | 7 |
| 6 | Water-reducible moisture-curing polyurethane coating with tertiary butyl acetate solvent | 3 | 4 | 6 | 7 |

The data of Table 5 demonstrate that the water-reducible single-component moisture-curing polyurethane coating of Example 3 with a dimethyl carbonate solvent has excellent drying times relative to the single- and plural-component moisture curing polyurethane coatings of Examples 1 and 2 used as controls. Further, the coatings of Examples 4-6 have drying times which are between those of the single and plural-component moisture curing polyurethane coatings of Examples 1 and 2. The decreased or comparable time to dry represents a significant improvement because the coated vehicle or other object can be quickly moved from the spray booth following coating application increasing throughput and decreasing cost to the applicator. These results are achieved for Examples 3-6 with no requirement for VOC-containing solvents. Examples 3-6, therefore, represent excellent water-reducible single-component moisture-curing polyurethane coatings.

Examples 3 and 7

Water-reducible single-component moisture-curing polyurethane coating compositions were evaluated for surface properties of the finished-form films and for drying time. Example 7 was a water-reducible single-component moisture-curing polyurethane coating composition made according to the process described in connection with Examples 3-6, but with an admixture comprising about 45% by weight pigmented dispersion and about 55% by weight let down including water-reducible aliphatic polyisocyanate.

Example 7 demonstrates that water-reducible single-component moisture-curing polyurethane coating compositions are effective at ranges other than the range of Examples 3-6. Persons of skill in the art will appreciate that the coating compositions may be formulated with other weight percentage ranges while still providing an efficacious coating. Examples 3 and 7 demonstrate that water-reducible single-component moisture-curing polyurethane coating compositions can be formulated to meet the needs of the formulator and end user.

Exemplary water-reducible single-component moisture-curing polyurethane coating compositions according to Example 3 and Example 7 were separately spray-applied to a flat Bonderite 1000 steel panel with a plural-component proportioning system at a ratio of 1 part water-reducible single-component moisture-curing polyurethane coating to 0.4 part water. Each coating was permitted to cure at about 75° F. and about 30% relative humidity. No external heat source was provided.

Each coating of Examples 3 and 7 was applied to the panel in a "stepped" manner, meaning that the coating compositions were applied to three different regions of the panel with each region having a finished-form film thicknesses different from that of the other regions. The purpose of the stepped application was to permit side-by-side evaluation of the effect of the film thickness on the surface quality and drying times. Table 6 indicates the thickness of each film in units of mils DFT.

Measurements were taken of the gloss and sheen of each of the cured finished-form films resulting from the coating compositions of Examples 3 and 7. The measurements were taken using a Byk Instruments glossmeter (Byk Instruments, Norwalk, Conn.). The measurement of film gloss was taken at an angle of 60° to the coated surface and the measurement of sheen was taken at an angle of 85° to the coated surface. The gloss and sheen measurements are provided in Table 6.

Observations were made of drying times for Examples 3 and 7 according to ASTM D 1640 in the same manner as described previously for Examples 1-6. The drying time data are presented in Table 7.

TABLE 6

Examples 3 and 7 - Surface Properties

| Example No. | Thickness DFT (mils) | Surface Condition | Surface Imperfections | 60 Degree Gloss | 85 Degree Sheen |
|---|---|---|---|---|---|
| 3 | 5.6 | Excellent | None | 2.0 | 0.9 |
|   | 8.0 | Excellent | None | 2.1 | 1.1 |
|   | 11.0 | Excellent | None | 2.1 | 1.2 |
| 7 | 3.7 | Excellent | None | 2.0 | 1.4 |
|   | 5.5 | Excellent | None | 2.1 | 1.4 |
|   | 7.4 | Fair | Sagging observed No crazing or blistering | 2.3 | 1.7 |

Examples 3 and 7 demonstrate that water-reducible single-component moisture-curing polyurethane coating compositions have excellent surface properties. At each thickness build evaluated, the coating composition of Example 3 had a smooth, uniform surface characterized as excellent. No surface imperfections such as blisters, crazing, or sagging were observed through and including thicknesses of and exceeding 11 mils DFT.

The coating composition of Example 7 had a smooth, uniform surface characterized as excellent through a thickness of 5.5 mils DFT, which is excellent for coatings applied to vehicles and other objects. Sagging was observed, but only at a thickness of 7.4 mils DFT. No blister or crazing type imperfections were observed for Example 7.

The coating compositions of Examples 3 and 7 had gloss and sheen values, respectively, not exceeding 2.3 and 1.7 which are within the values of 3.0 (gloss) and 8.0 (sheen) permitted by U.S. Military Standard MIL-DTL-53039D for Aircraft White. The compositions of Examples 3 and 7 represent excellent coating compositions.

TABLE 7

Examples 3 and 7 - Drying Time

| Example No. | 0 Minutes | 30 Minutes | 60 Minutes | 90 Minutes | 120 Minutes |
|---|---|---|---|---|---|
| 1 | Wet | Wet | Set to Touch | Set to Touch | Set to Touch |
| 2 | Wet | Set to Touch | Set to Touch | Set to Touch | Set to Touch |
| 3 | Wet | Set to Touch | Dry Hard | Dry Hard | Dry Through |
| 7 | Wet | Slightly Tacky | Tacky | Set to Touch | Dry Hard |

Table 7 compares drying time of Examples 1-2 (Table 5) with Examples 3 and 7. The data of Tables 5 and 7 indicate that the composition of Example 3 has better drying times than the single- and plural-component moisture-curing polyurethane coating compositions used as controls. Table 7 further indicates that the composition of Example 7 requires less time to reach a dry hard state than the single- and plural-component moisture-curing polyurethane coating compositions of Examples 1 and 2 while not including VOC-containing solvents. Table 7 further confirms that the compositions of Examples 3 and 7 represent excellent coating compositions.

Examples 8 and 9

Examples 8 and 9 are two theoretical examples representing exemplary moisture-curing polyurethane coating compositions wherein the VOC-exempt solvent could be provided in amounts comprising, respectively, 30 and 50 percent by weight of the total composition. Compositions according to theoretical Examples 8 and 9 could be prepared according to the process described in connection with Examples 3-6. Tables 8, 9, and 10 list the theoretical constituents of the pigmented slurry, pigmented dispersion, and water-reducible single-component moisture-curing polyurethane coating compositions.

TABLE 8

Pigmented Slurry

| No. | Constituent/Source | Description | Example 8 30% Solvent Amount (grams) | Example 8 30% Solvent Wt % (Total Composition) | Example 9 50% Solvent Amount (grams) | Example 9 50% Solvent Wt % (Total Composition) |
|---|---|---|---|---|---|---|
| 1 | Dimethyl carbonate | VOC-exempt solvent | 12.00 g | 12.00% | 10.0 g | 10.0% |
| 2 | Anti-Terra-U100 (Byk-Chemie USA, Wallingford, CT) | dispersing agent | 1.00 g | 1.00% | 0.78 g | 0.78% |
| 3 | Byk 320 (Byk Chemie USA, Hartford, CT) | flow agent | 0.09 g | 0.09% | 0.07 g | 0.07% |
| 4 | Bentone 27 (Elementis Specialties, Highstown, NJ) | thixotrope | 0.90 g | 0.09% | 0.70 g | 0.70% |
| 5 | Titanium dioxide TR93 (Tioxide Americas, Inc. The Woodlands, TX) | color pigment | 30.24 g | 30.24% | 19.22 g | 19.22% |
|   | TOTAL Pigmented Slurry | | 44.23 g | 44.23% | 30.77 g | 30.77% |

TABLE 9

Pigmented Dispersion With Isocyanate and Polyol Constituents

| No. | Constituent/Source | Description | Example 8 30% Solvent Amount (grams) | Example 8 30% Solvent Wt % (Total Composition) | Example 9 50% Solvent Amount (grams) | Example 9 50% Solvent Wt % (Total Composition) |
|---|---|---|---|---|---|---|
| | | Dehydration Reaction | | | | |
| 6 | Pigmented Slurry (Table 8) | *** | 44.23 g | 44.23% | 30.77 g | 30.77% |
| 7 | Isophorone diisocyanate (IPDI) (Desmodur IPDI Vestanat Brenntag Great Lakes, Wauwatosa, WI | dehydration reagent | 0.34 g | 0.34% | 0.26 g | 0.26% |
| 8 | Isophorone diisocyanate (IPDI) (excess of amount required for dehydration reaction) | polyol extender | 0.42 g | 0.42% | 0.33 g | 0.33% |
| 9 | Durastab LT-2 (Dura Chemicals, Inc. Emeryville, CA) | catalyst | 0.25 g | 0.25% | 0.19 g | 0.19% |
| | | Extension Reaction | | | | |
| 10 | Diexter-G TMPD-120 (COIM USA West Deptford, NJ) | polyol | 1.90 g | 1.90% | 1.47 g | 1.47% |
| 11 | Dimethyl carbonate | VOC-exempt solvent | 8.0 g | 8.0% | 16.59 g | 16.59% |
| | TOTAL Pigmented Dispersion | | 55.14 g | 55.14% | 49.61 g | 49.61% |

TABLE 10

Water-reducible Single-Component Moisture-curing Polyurethane Coating Compositions

| No. | Constituent/Source | Description | Example 8 30% Solvent Amount (grams) | Example 8 30% Solvent Wt % (Total Composition) | Example 9 50% Solvent Amount (grams) | Example 9 50% Solvent Wt % (Total Composition) |
|---|---|---|---|---|---|---|
| 12 | Pigmented Dispersion (Table 9) | *** | 55.14 g | 55.14% | 49.61 g | 49.61% |
| 13 | Rhodocoat WT 2102 (Perstorp Polyols, Inc. Toledo, OH) | water-reducible aliphatic polyisocyanate | 15.82 g | 15.82% | 12.25 g | 12.25% |
| 14 | Dimethyl carbonate | VOC-exempt solvent | 10.00 g | 10.00% | 23.41 g | 23.41% |
| 15 | Shamrock SPP-25 polyproplyene (Shamrock Technologies, Newark, NJ) | matting component | 18.60 g | 18.60% | 14.39 g | 14.39% |
| 16 | Hostavin 3055 (Clariant Corp., Coventry, RI) | hindered amine light stabilizer | 0.40 g | 0.40% | 0.31 g | 0.31% |
| 17 | Butyl Acid Phosphate | acid catalyst | 0.05 g | 0.05% | 0.03 g | 0.03% |
| | TOTAL | | 100 g | 100% | 100 g | 100% |

While compositions according to Examples 8 and 9 were not actually prepared, it is expected that water-reducible moisture-curing polyurethane coating compositions made according to the formulae would be effective in yielding a composition which would cure to provide a finished-form film with satisfactory drying times and surface appearance. It is expected that efficacious variations of Examples 8 and 9 could be formulated, for example, compositions formulated with 60 percent by weight VOC-exempt organic solvent.

\* \* \*

It is believed that the invention has been described in such detail as to enable those skilled in the art to understand the same and it will be appreciated that variations may be made without departing from the spirit and scope of the invention.

What is claimed is:

1. A water-reducible single-component moisture-curing polyurethane coating composition comprising:
    about 70 to about 25 percent by weight of a substantially-dehydrated pigmented dispersion; and
    about 30 to about 75 percent by weight let down including water-reducible aliphatic polyisocyanate, the pigmented dispersion and let down forming a substantially-dehydrated coating composition,
wherein, the coating composition is water-reducible.

2. The coating composition of claim 1 wherein the pigmented dispersion includes, based on the total composition, about 15 to about 60 percent by weight VOC-exempt organic solvent.

3. The coating composition of claim 2 wherein the pigmented dispersion includes, based on the total coating composition, about 30 to about 50 percent by weight of the VOC-exempt organic solvent.

4. The coating composition of claim 2 wherein the VOC-exempt organic solvent is selected from the group consisting of dimethyl carbonate, propylene carbonate, tertiary butyl acetate, methyl acetate, acetone, and mixtures thereof.

5. The coating composition of claim 4 wherein the pigmented dispersion further includes, based on the total coating composition:
    about 20 to about 65 percent by weight pigmented slurry, the pigmented slurry including about 5 to about 30 percent by weight of the VOC-exempt solvent; and
    about 0.2 to about 5 percent by weight dehydrating agent to remove essentially all water from the pigmented slurry.

6. The coating composition of claim 5 wherein the dehydrating agent is selected from the group consisting of monomeric polyisocyanate, monomeric monoisocyanate, and mixtures thereof.

7. The coating composition of claim 6 wherein the monomeric polyisocyanate dehydrating agent is selected from the group consisting of isophorone diisocyanate, trimethyl hexamethylene diisocyanate, hexamethylene diisocyanate, toluene diisocyanate, diphenylmethane diisocyanate, and mixtures thereof.

8. The coating composition of claim 7 wherein the monomeric monoisocyanate dehydrating agent is selected from the group consisting of sulphonyl isocyanate, phenyl isocyanate, butyl isocyanate, and mixtures thereof.

9. The coating composition of claim 8 wherein the sulphonyl isocyanate is paratoluenesulphonyl isocyanate.

10. The coating composition of claim 5 wherein the dehydrating agent is selected from the group consisting of orthoester, organic solvent, and molecular sieves.

11. The coating composition of claim 10 wherein the pigmented dispersion further includes, based on the total coating composition, about 0.2 to about 5 percent by weight polyol selected from the group consisting of polycaprolactone polyol, polyester polyol, polytetramethylene ether glycol, polypropylene glycol polyester diol, butane diol, polyether diol, cyclohexane dimethanol, and mixtures thereof.

12. The coating composition of claim 6 wherein the pigmented dispersion further includes, based on the total coating composition, about 0.2 to about 5 percent by weight polyol.

13. The coating composition of claim 12 wherein the polyol is selected from the group consisting of polycaprolactone polyol, polyester polyol, polytetramethylene ether glycol, polypropylene glycol, polyether diol, polyester diol, butane diol, polyether diol, cyclohexane dimethanol, and mixtures thereof.

14. The coating composition of claim 5 wherein the pigmented dispersion further includes a catalyst selected from the group consisting of organometallic catalyst, tertiary amine catalyst, and mixtures thereof.

15. The coating composition of claim 1 wherein the let down includes, based on the total coating composition, about 5 to about 30 percent by weight of the water-reducible aliphatic polyisocyanate.

16. The coating composition of claim 15 wherein the let down includes, based on the total coating composition, about 12 to about 16 percent by weight of the water-reducible aliphatic polyisocyanate.

17. The coating composition of claim 15 wherein the water-reducible aliphatic polyisocyanate is selected from the group consisting of dimers, trimers, and oligomers of hexamethylene diisocyanate, and mixtures thereof.

18. The coating composition of claim 17 wherein the let down includes, based on the total coating composition, about 5 to about 30 percent by weight VOC-exempt organic solvent.

19. The coating composition of claim 18 wherein the VOC-exempt organic solvent is selected from the group consisting of dimethyl carbonate, propylene carbonate, tertiary butyl acetate, methyl acetate, acetone, and mixtures thereof.

20. The coating composition of claim 1 wherein the coating composition further includes, based on the total coating composition, about 5 to about 25 percent by weight matting agent.

21. The coating composition of claim 20 wherein the matting agent is selected from the group consisting of polyethylene wax, polypropylene wax, and mixtures thereof.

22. A water-reducible single-component moisture-curing polyurethane coating composition comprising:
    about 70 to about 25 percent by weight of a substantially-dehydrated pigmented dispersion including a VOC-exempt organic solvent selected from the group consisting of dimethyl carbonate, propylene carbonate, tertiary butyl acetate, methyl acetate, acetone, and mixtures thereof; and
    about 30 to about 75 percent by weight let down including water-reducible aliphatic polyisocyanate, the pigmented dispersion and let down forming a substantially-dehydrated coating composition,
wherein, the coating composition is water-reducible.

23. The coating composition of claim 22 wherein the pigmented dispersion includes, based on the total coating composition:
    about 20 to about 65 percent by weight pigmented slurry;
    about 15 to about 60 percent by weight of the VOC-exempt organic solvent;

about 0.2 to about 5 percent by weight dehydrating agent; and about 0.2 to about 5 percent by weight polyol.

24. The coating composition of claim 23 wherein the pigmented dispersion includes, based on the total coating composition, about 30 to about 50 percent by weight of the VOC-exempt organic solvent.

25. The coating composition of claim 23 wherein the dehydrating agent is selected from the group consisting of isophorone diisocyanate, trimethyl hexamethylene diisocyanate, hexamethylene diisocyanate, toluene diisocyanate, diphenyl methane diisocyanate, sulphonyl isocyanate, phenyl isocyanate, butyl isocyanate, and mixtures thereof.

26. The coating composition of claim 23 wherein the dehydrating agent is selected from the group consisting of orthoester, organic solvent, and molecular sieves.

27. The coating composition of claim 23 wherein the polyol is selected from the group consisting of polycaprolactone polyol, polyester polyol, polytetramethylene ether glycol, polypropylene glycol, polyester diol, butane diol, polyether diol, cyclohexane dimethanol, and mixtures thereof.

28. The coating composition of claim 23 wherein the pigmented dispersion further includes a catalyst selected from the group consisting of an organometallic catalyst, a tertiary amine catalyst, and mixtures thereof.

29. The coating composition of claim 22 wherein the let down includes, based on the total coating composition:

about 5 to about 30 percent by weight of the water-reducible aliphatic polyisocyanate; and about 5 to about 30 percent by weight of the VOC-exempt solvent.

30. The coating composition of claim 29 wherein the water-reducible aliphatic polyisocyanate is selected from the group consisting of dimers, trimers, and oligomers of hexamethylene diisocyanate, and mixtures thereof.

31. The coating composition of claim 30 wherein the let down includes, based on the total coating composition, about 12 to about 16 percent by weight of the water-reducible aliphatic polyisocyanate.

32. The coating composition of claim 22 wherein the coating composition further comprises, based on the total coating composition, about 5 to about 25 percent by weight of a matting agent.

33. The coating composition of claim 32 wherein the let down includes the matting agent.

34. The coating composition of claim 33 wherein the matting agent is selected from the group consisting of polyethylene wax, polypropylene wax, and mixtures thereof.

* * * * *